(12) United States Patent
Wang et al.

(10) Patent No.: US 10,662,870 B2
(45) Date of Patent: May 26, 2020

(54) VARIABLE GEOMETRY WASTEGATE TURBINE

(71) Applicant: KANGYUE TECHNOLOGY CO., LTD., Shouguang, Shandong (CN)

(72) Inventors: Hang Wang, Shandong (CN); Wuhai Sang, Shandong (CN); Daojun Yuan, Shandong (CN); Lihua Song, Shandong (CN); Xiaofen Xin, Shandong (CN); Wei Li, Shandong (CN)

(73) Assignee: KANGYUE TECHNOLOGY CO., LTD., Shouguang, Shandong (CN)

( * ) Notice: Subject to any disclaimer, the term of this patent is extended or adjusted under 35 U.S.C. 154(b) by 331 days.

(21) Appl. No.: 15/553,542

(22) PCT Filed: Aug. 4, 2015

(86) PCT No.: PCT/CN2015/086000
§ 371 (c)(1),
(2) Date: Aug. 24, 2017

(87) PCT Pub. No.: WO2016/134584
PCT Pub. Date: Sep. 1, 2016

(65) Prior Publication Data
US 2018/0238226 A1 Aug. 23, 2018

(30) Foreign Application Priority Data

Feb. 25, 2015 (CN) .......................... 2015 1 0086729
Jun. 25, 2015 (CN) .......................... 2015 1 0358065

(51) Int. Cl.
*F02B 37/18* (2006.01)
*F02B 37/22* (2006.01)
(Continued)

(52) U.S. Cl.
CPC ............ *F02B 37/186* (2013.01); *F01D 9/041* (2013.01); *F01D 9/045* (2013.01); *F02B 37/025* (2013.01);
(Continued)

(58) Field of Classification Search
CPC ...... F02B 37/186; F02B 37/22; F02B 37/025; F02B 37/183; F02B 75/18;
(Continued)

(56) References Cited

U.S. PATENT DOCUMENTS 6,983,596 B2 * 1/2006 Frankenstein ........ F02B 37/025
60/602
8,196,403 B2 * 6/2012 Hittle ..................... F02M 26/47
60/602
(Continued)

FOREIGN PATENT DOCUMENTS

CN 101688447 A 3/2010
CN 201794626 U 4/2011
(Continued)

OTHER PUBLICATIONS

International Search Report for PCT/CN2015/086000, dated Dec. 1, 2015, ISA/CN.

*Primary Examiner* — Mark A Laurenzi
*Assistant Examiner* — Edward Bushard
(74) *Attorney, Agent, or Firm* — Yue (Robert) Xu; Apex Attorneys at Law, LLP

(57) ABSTRACT

A variable geometry turbine having a wastegate includes a turbine housing, a power turbine, and a regulating valve. The turbine housing is provided with an inner intake gas flow channel and an outer intake gas flow channel. The turbine housing is further provided with a wastegate pipeline configured to bypass the power turbine, and a wastegate valve configured to control communication of the wastegate pipe-
(Continued)

line. One of the regulating valve and the wastegate valve has a regulating face having a varying axial height in a rotation direction of the regulating valve, and the other of the regulating valve and the wastegate valve has a linking portion which makes contact and cooperates with the regulating face. Thus, the efficiency of the turbine is improved significantly and backflow of the gas flow is reduced.

18 Claims, 16 Drawing Sheets

(51) Int. Cl.
| | |
|---|---|
| *F02B 37/02* | (2006.01) |
| *F02M 26/05* | (2016.01) |
| *F01D 9/04* | (2006.01) |
| *F02B 75/18* | (2006.01) |
| *F01D 9/02* | (2006.01) |
| *F01D 17/10* | (2006.01) |

(52) U.S. Cl.
CPC ............ *F02B 37/183* (2013.01); *F02B 37/22* (2013.01); *F02B 75/18* (2013.01); *F02M 26/05* (2016.02); *F01D 9/026* (2013.01); *F01D 17/105* (2013.01); *F02B 2075/1824* (2013.01); *F05D 2220/40* (2013.01); *F05D 2240/128* (2013.01); *F05D 2240/14* (2013.01); *Y02T 10/144* (2013.01)

(58) Field of Classification Search
CPC . F02B 2075/1824; F02M 26/05; F01D 9/041; F01D 9/045; F01D 9/026; F01D 17/105; F05D 2240/128; F05D 2220/40; F05D 2240/14; Y02T 10/144

USPC .......................................................... 60/602
See application file for complete search history.

(56) References Cited

U.S. PATENT DOCUMENTS

| | | | |
|---|---|---|---|
| 9,359,939 B2 * | 6/2016 | Kindl .................... | F02B 37/001 |
| 10,227,889 B2 * | 3/2019 | Arnold .................... | F01D 5/043 |
| 10,273,873 B2 * | 4/2019 | Stilgenbauer ......... | F02B 37/025 |
| 2008/0000460 A1 * | 1/2008 | Hertweck ............. | F02B 37/025 |
| | | | 123/559.1 |
| 2008/0171623 A1 | 7/2008 | Yamada et al. | |
| 2009/0000296 A1 | 1/2009 | Pierpont et al. | |
| 2011/0167804 A1 | 7/2011 | Arvan | |
| 2011/0268559 A1 | 11/2011 | Lombard et al. | |
| 2012/0001111 A1 * | 1/2012 | Takeda ................. | F02B 37/186 |
| | | | 251/231 |
| 2012/0017869 A1 | 1/2012 | Rammer et al. | |
| 2014/0060041 A1 | 3/2014 | Makino et al. | |
| 2018/0355789 A1 * | 12/2018 | Onogi ................... | F01D 17/105 |

FOREIGN PATENT DOCUMENTS

| | | |
|---|---|---|
| CN | 201802477 U | 4/2011 |
| CN | 102128072 A | 7/2011 |
| CN | 102182544 A | 9/2011 |
| CN | 102345516 A | 2/2012 |
| CN | 202266306 U | 6/2012 |
| CN | 202417695 U | 9/2012 |
| CN | 102959196 A | 3/2013 |
| CN | 103670680 A | 3/2014 |
| CN | 104675452 A | 6/2015 |
| JP | 2008169757 A | 7/2008 |

* cited by examiner

VARIABLE GEOMETRY WASTEGATE TURBINE

This application is a National Phase entry of PCT Application No. PCT/CN2015/086000, filed Aug. 4, 2015, which claims the priorities to two Chinese patent applications below, the entire disclosures of which are incorporated herein by reference:

1, Chinese Patent Application No. 201510358065.8 titled "VARIABLE GEOMETRY TURBINE WITH WASTEGATE MEETING THE REQUIREMENTS OF EGR CIRCULATION", and filed with the Chinese State Intellectual Property Office on Jun. 25, 2015; and 2, Chinese Patent Application No. 201510086729.X titled "VARIABLE GEOMETRY TURBINE WITH WASTEGATE MEETING THE REQUIREMENTS OF EGR CIRCULATION", and filed with the Chinese State Intellectual Property Office on Feb. 25, 2015, the entire disclosures of which are incorporated herein by reference.

FIELD

The present application relates to the technical field of engines, and more particularly to a variable geometry turbine having a wastegate.

BACKGROUND

As emission regulations become more stringent, engines increasingly rely on Exhaust Gas Recirculation (EGR) to reduce $NO_x$. EGR systems recirculate a portion of engine exhaust gas back into the combustion cylinders.

$NO_x$ is extremely harmful to the human body and is mainly produced in a high-temperature and oxygen-rich circumstance. The higher the combustion temperature is and the longer the time duration is, the more the $NO_x$ product is. In the operation of the engine, if a part of the exhaust gas is directed into the cylinder again timely and moderately, a part of heat produced by combustion is absorbed and brought out the cylinder through the exhaust gas, and the intake gas is diluted by the exhaust gas to some degree, since a main component $CO_2$ of the exhaust gas has a large heat capacity. Thus, a highest temperature and an oxygen content of the engine combustion are reduced, and thereby the $NO_x$ compounds are reduced.

In a supercharged and intercooled diesel engine, a main way to perform the exhaust gas recirculation is to direct the exhaust gas, located at front of a turbine, into an intercooler, which is called high-pressure exhaust gas recirculation. In order to ensure a stable EGR rate in different operation conditions, the best way is to adopt a variable geometry turbocharger, in which a difference between a pressure PT before the turbine and a pressure PK after the intercooling is adjusted by changing the geometry of the turbocharger for driving an EGR valve.

Most of current variable geometry turbochargers are added a rotatable nozzle blade in the turbine. The communication of a channel of the turbine is changed by changing an opening degree of the nozzle blade, which is easy to control. However, since the exhaust gas discharged from the engine has a high temperature of about 700 degrees Celsius and the temperature may be getting higher, the high temperature has proposed strict requirements on the nozzle blade, a transmission mechanism, a nozzle ring support disc and an external control system, and, impurities in the high-temperature exhaust gas discharged from the engine pose a reliability risk on a complex moving component.

Moreover, the variable geometry turbocharger is only applied in the field of high-end engine supercharging due to an expensive price. Therefore, marketing for such a product is limited in terms of cost and reliability. In addition to the above main factors, there are other technical problems.

The first problem is that: when a flow rate is reduced, the opening degree of the nozzle blade is required to be reduced, thus a circumferential speed of the turbine intake gas increases, the turbine becomes an impulsive impeller, which does not facilitate making full use of exhaust gas energy, and thus an efficiency for the turbine is low, and an exhaust back pressure of the engine high.

The second problem is that: when the opening degree of the blade is small, a flow path for the turbine intake gas is increased, and flowing loss is increased, thus the nozzle blade is over far away from the turbine, and the gas flow mixing loss is increased.

The third problem is that: a gap must present at both ends of the blade, so as to facilitate the rotation of the blade, however, this gap may cause leakage loss and reduce efficiency of the turbine.

Another widely applied variable geometry application is a two-layer flow channel variable geometry turbocharger developed by Kangyue Technology CO., LTD. By designing the structure of the traditional turbine housing, a combination of internal and external two-layer intake channels is adopted to form different flow passage cross sections. Therefore, all functions of the variable geometry turbine can be achieved by effective usage of the exhaust gas energy of the engine in different sections without providing a complex rotary vane pneumatic regulation mechanism, and thus the cost is greatly reduced, the reliability is greatly improved, and this will become a research direction in the future.

A structural principle of such a product is as shown in FIG. 1, when the engine operates at a low speed and a low load, the supercharging pressure is low, and a regulating valve 5 is closed, that is, only an inner intake flow channel 3 is communicated in a turbine housing 1, and the gas flow flows along a flowing direction 4 of an inner intake flow channel so as to allow the turbine to work.

As shown in FIG. 2, when the supercharging pressure reaches a certain degree, a control actuator 7 pushes a valve pin piece assembly 6. The valve pin piece assembly 6 opens the regulating valve 5. The inner intake flow channel 3 and an outer intake flow channel 2 work simultaneously, the gas flow flows along the flow direction 4 of the inner intake flow channel flowing direction 4 and a flow direction 8 of the outer intake flow channel, so as to allow the turbine to work. However, there are a lot of problems in this structure in an actual fitting testing and application process.

The problems are described as follows:

firstly, when the engine operates at a high speed, a large amount of exhaust gas is discharged, and in order to ensure high-speed performance and avoid overspeed of the engine due to the turbine pressure at high-speed operation, the cross sectional area of the two-layer flow channel is relatively large; in terms of the cross sectional area allocation for the two-layer flow channel, low-speed performance and the EGR rate of the engine are affected if the inner intake flow channel has a relatively large cross sectional area; and an cross sectional area difference between the inner intake flow channel and the outer intake flow channel is large if the inner intake flow channel has a small cross sectional area, thus, transient expansion loss is too large in the case that the regulating valve is opened, and it is difficult to control the engine at a middle speed under medium-load;

secondly, the flow rate and the pressure cannot be controlled accurately through a simple valve structure shown in FIGS. 1 and 2 in the middle speed of the engine under the medium-load phase, further, control deviation of the flow rate and the pressure will not only affect matching performance, but also affect the EGR rate, which results in excessive engine emissions;

thirdly, multiple vortex tongues are formed by formation of the inner intake flow channel and the outer flow intake channel, and gas flows are easy to be affected by each other, which results in the reducing of the efficiency of the turbine; and fourthly, the structure of the turbine provided with the inner and outer flow channels is complex, and the turbine is also a casting part, therefore, producing consistency is difficult to control, and if the casting deviation of the two flow channels is large, the effect on the matching performance of the turbine is also large.

SUMMARY

In order to solve the above-mentioned technical problems, a variable geometry turbine having a wastegate is provided according to the present application, which can reduce the instant expansion loss when the regulating valve is opened.

A variable geometry turbine having a wastegate, provided by the present application, includes a turbine housing and a power turbine, the turbine housing is provided with an inner intake gas flow channel and an outer intake gas flow channel which guide exhaust gas of an engine into the power turbine to drive the power turbine to rotate, the turbine housing is further provided with a wastegate pipeline configured to bypass the power turbine, and a wastegate valve for controlling the communication and cutting off of the wastegate pipeline. In the case that an intake gas amount of the exhaust gas entering into the turbine exceeds a specific value, the wastegate valve is opened to discharge a part of the exhaust gas via the wastegate pipeline.

Optionally, the variable geometry turbine having the wastegate further includes a regulating valve, having an adjustable opening degree, configured to regulate an intake gas amount of the outer intake gas flow channel. The regulating valve and the wastegate valve are configured in a linkage mode, such that the wastegate valve is opened in the case that the regulating valve is opened to a specific angle.

Optionally, the regulating valve is a rotatable midship valve, and the exhaust gas enters via both sides of a body of the regulating valve during rotation of the regulating valve.

Optionally, one of the regulating valve and the wastegate valve has a regulating face having a varying axial height in a rotation direction of the regulating valve, and the other of the regulating valve and the wastegate valve has a linking portion which makes contact and cooperates with the regulating face, such that the wastegate valve is moved in an axial direction of the regulating valve and opened in the case that the regulating valve is rotated.

Optionally, the regulating valve makes contact with the wastegate valve in an axial direction of the regulating valve, and the variable geometry turbine having wastegate further comprises an end cap mounted on the turbine housing, and the end cap is snapped into an end face of the regulating valve for driving the regulating valve to rotate, one of the end cap and the regulating valve has a regulating face having a varying axial height in a rotation direction of the regulating valve, the other of the end cap and the regulating valve has a linking portion which makes contact and cooperates with the regulating face, such that the wastegate valve is moved in an axial direction of the regulating valve and opened in the case that the regulating valve is rotated.

Optionally, the axial height of the regulating face increases spirally around a rotation axis center of the regulating valve, and the linking portion is a regulating rod which makes contact and cooperates with the regulating face.

Optionally, the regulating face has a convex portion which protrudes smoothly in the rotation direction of the regulating valve and a concave portion correspondingly formed on the regulating face, and the linking portion is an axial projection, the axial projection slides on the concave portion and the convex portion successively when the axial projection rotates with respect to the regulating face.

Optionally, the regulating valve is provided with a cam which rotates along with the regulating valve, and the wastegate valve is provided with a regulating rod which makes contact and cooperates with an edge of the cam.

Optionally, the variable geometry turbine having the wastegate further includes a spring, wherein the spring is configured to control the wastegate valve to reset into a closed state when between the regulating valve and the wastegate valve are not linked.

Optionally, the variable geometry turbine having the wastegate further includes a valve seat, wherein the valve seat is provided with a valve seat inner flow channel interface, a valve seat outer flow channel interface, a valve seat wastegate inlet and a valve seat wastegate outlet, wherein the regulating valve and the wastegate valve are arranged in the valve seat, the valve seat is arranged between an exhaust pipe and an intake gas end of the turbine housing.

Optionally, the wastegate valve is mounted directly in the turbine housing, and the regulating valve is inserted into the turbine housing for directly regulating the intake gas amount entering into the outer intake gas flow channel.

Optionally, the turbine is provided with two sets of the outer intake gas flow channels, and the inner intake gas flow channels and the wastegate pipelines for a six-cylinder engine, and the regulating valve includes two valve bodies connected with each other, and after being inserted into the turbine housing, the two valve bodies are configured to control intake gas amounts of the two outer intake gas flow channels simultaneously and respectively.

Optionally, the variable geometry turbine having the wastegate further includes a guide blade support disc arranged at an intake gas end face of the power turbine, wherein multiple first guide channels and multiple second guide channels are arranged at intervals on the guide blade support disc in a circumferential direction of the guide blade support disc, the first guide channel and the second guide channel form a predetermined angle, such that the exhaust gas flowing out of the inner intake gas flow channel is guided to the power turbine via the multiple first guide channels, and the exhaust gas flowing out of the outer intake gas flow channel is guided to the power turbine via the multiple second guide channels.

Optionally, multiple guide blades which protrude from a torus of the guide blade support disc are circumferentially arranged on the torus, each of the guide blades is provided with a guide groove running through the guide blade, and multiple slotted guide blade is formed, a channel between adjacent slotted guide blades form the multiple first guide channel, and the guide grooves form the multiple second guide channels.

Optionally, multiple long guide blades and multiple short guide blades are arranged on the torus of the guide blade support disc alternately, and the long guide blades and short guide blades protrude from the torus, and in a counter-clockwise direction, channels between the multiple long guide blades and the plurality of short guide blades form the plurality of second guide channels, and channels between the multiple short guide blade and the multiple long guide blade form the plurality of first guide channels.

Optionally, an arrangement angle B of each of the long guide blades ranges from 68° to 80°, and an arrangement angle A of each of the short guide blades meets the requirement of a following equation: B−A=0°~5°.

The turbine provided by the present application is provided with the wastegate pipeline for bypassing the power turbine, and the wastegate valve for controlling communication and cutting off of the wastegate pipeline. When the intake gas amount of the exhaust gas entering into the turbine exceeds a preset value, the wastegate valve is opened to discharge a part of the exhaust gas via the wastegate pipeline. Therefore, when the engine operates at a high speed, the wastegate valve can be opened to discharge a part of the exhaust gas via the wastegate pipeline, thereby avoiding overspeed of the supercharger. Further, there is no need to set a large area of the outer intake gas flow channel for avoiding the overspeed of the supercharger in the case of the high speed, and a small area of the outer intake gas flow channel can be set, as long as turbine drive performance and circulation at a middle speed and medium load are ensured. Moreover, in the case that the regulating valve is opened when the engine is converted from a low speed and a low load to a middle speed, the expansion loss is decreased due to a small area difference between the inner intake gas flow channel and the outer intake gas flow channel.

A variable geometry turbine having a wastegate is provided according to the present application. The variable geometry turbine having the wastegate includes a turbine housing, wherein the turbine housing is provided with an inner intake gas flow channel and an outer intake gas flow channel, each of the inner intake gas flow channel and the outer intake gas flow channel is in a non-full circumference structure, and the inner intake gas flow channel carries intake gas, from 0° to 150°~230°, of a power turbine, and the outer intake gas flow channel carries intake gas from 150°~230° to 360°, wherein the turbine housing is further provided with a wastegate pipeline, and the wastegate pipeline is arranged in parallel with the outer intake gas flow channel and the inner intake gas flow channel without passing through the power turbine.

The above solution of the present application is further optimized below.

The turbine further includes the power turbine, a valve seat, an exhaust pipe and a control accessory, and the turbine housing, the valve seat and the exhaust pipe are sealingly connected together.

Further, a regulating valve is mounted in the valve seat, the regulating valve is configured to regulate an intake gas amount of the outer intake gas flow channel.

Further, an end of the regulating valve is provided with a regulating face in a spiral structure.

Further, an axial height of the regulating face increases spirally around an axis center of the regulating valve Further, a wastegate valve which cooperates with the regulating valve is arranged in the wastegate pipeline, the wastegate valve is mounted in the valve seat through a wastegate valve bushing, a spring is mounted between the wastegate valve and the wastegate valve bushing, one side of the wastegate valve close to the regulating valve is provided with a regulating rod which cooperates with the regulating face.

In the operation, the control accessory drives the regulating valve to rotate, the regulating face of the regulating valve pushes the regulating rod while an intake gas amount of the outer intake flow passage is regulated by the regulating valve, and the wastegate valve is opened and the spring is compressed, and the exhaust gas to be bypassed is discharged from the wastegate pipeline. When the regulating valve returns to an initial position, the wastegate valve returns to an initial position under the action of elastic force of the spring, and the exhaust gas is no longer bypassed.

Further, a guide blade support disc is mounted at a position close to the power turbine in the turbine housing, and a plurality of slotted guide blades are arranged on the guide blade support disc, and the plurality of slotted guide blades are evenly in a shape of a ring uniformly.

A guide groove is arranged at a middle position of each of the slotted guide blades, an arrangement angle (B) of each of the slotted guide blades ranges from 68° to 80°, and two groove edges of the guide groove are obtained by rotating a cut-way line around a center of the guide blade support disc, and the smallest width of the guide groove is 3 mm.

Each of the slotted guide blades is in a form of a gas-solid combined nozzle, wherein when the engine operates at a low speed and a low load, the inner intake gas flow channel of the turbine works, and an intake angle of the inner intake gas flow channel is obtained according to a formula $\tan(\alpha)=2\pi b/(A/r)$, where b is an inlet width of the turbine, which is a fixed valve, and the intake gas angle is defined based on A/r of the inner intake gas flow channel, a guide blade angle of the inner intake gas flow channel is designed based on the intake gas angle of the inner intake gas flow channel, which ensures that the guide blade angle is substantially the same as the intake gas angle, and the gas enters into the guide blades along the inner intake gas flow channel and then enters into the power turbine along the guide blades without turning loss, thereby aerodynamic efficiency is improved.

With the gradual increase of an engine speed, the gas flow increases, the outer intake gas flow channel takes part in the gas intake process when the regulating valve is opened, and an intake angle of the outer intake gas flow channel is also determined based on the A/r of the outer intake gas flow channel. A guide groove angle is designed based on the intake gas angle of the outer intake gas flow channel, which ensures that the guide groove angle is substantially the same as the intake gas angle of the outer intake gas flow channel. The gas enters into the guide groove along the outer intake gas flow channel, and then enters into the power turbine along the guide groove, thereby avoiding collision loss and turning loss upon in a case of installing a complete guide blade (without the guide groove), which not only improves efficiency, but also widens the flow rate. Moreover, a radial speed component increases quickly with the increase of a gas flow speed, and the flow at the high speed is broadened significantly due to the presence of the guide groove.

In the actual operation, when the engine operates at a low speed and a low load, the regulating valve is closed, the intake gas flows into the power turbine along the exhaust pipe, the valve seat gas inlet, the valve seat inner flow channel interface, the turbine housing inner flow channel inlet, the inner intake gas flow channel and the slotted guide blades, and drives the power turbine to work. At this time, the gas flow flows towards the power turbine along an intermediate zone between the two slotted guide blades and drives the power turbine to work. In this case, only the inner intake gas flow channel works, the geometry is small, and the gas flow enters only along the guide blade angle upon flowing through the slotted guide blades, thus the gas flow is concentrated, improving the pre-turbine pressure and improving the EGR rate.

As the gradual increase of the engine speed and engine load, the regulating valve is opened, a part of gas flow flows through the regulating valve, and then flows into the power turbine along an outer flow channel interface of the valve seat, the turbine housing outer flow channel inlet, the outer intake gas flow channel and the slotted guide blade, so as to meet the requirement of gradual increasing of the flow rate. In this process, by regulating the opening degree of the regulating valve, the pre-turbine pressure may be adjusted and an appropriate EGR rate is determined.

During regulating the regulating valve, after the regulating valve is rotated to a certain angle, a pushing force is applied to the regulating rod through the regulating face, and the regulating rod drives the wastegate valve to compress the spring, and then the wastegate pipeline is opened. The exhaust gas flows out along a exhaust pipe wastegate outlet, a valve seat wastegate inlet, a valve seat wastegate outlet, a turbine housing wastegate inlet and a turbine housing wastegate outlet, and a part energy of exhaust gas is exhausted, which ensures that the pre-turbine pressure of the supercharger is not too large in the case that the engine operates at a high speed under high load. Moreover, as the intake gas amount increases, the intake gas enters along the guide grooves on the slotted guide blades, thereby avoiding the gas flow blockage in a high-speed phase.

Another optimization solution is provided as follows: the slotted guide blades include long guide blades and short guide blades, wherein the length of each of the long guide blades is greater than the length of each of the short guide blades, and the long guide blades and the short guide blades are arranged alternately.

A trailing edge of the small guide blade and a leading edge of the long guide blade are spaced by a certain distance in the circumferential direction, which facilitates flowing of the gas flow into the spacing in the case that an engine operates at a high speed, thereby widening the flow rate and reducing the blockage, and realizing a function similar to that of the slotted guide blades.

An arrangement angle of each of the long guide blades ranges from 68° to 80°, and an angle difference between the arrangement angle B of each of the long guide blades and an arrangement angle A of each of the short guide blades is B−A=0°~5°.

The application adopts the gas-solid combined nozzle, which combines the advantages of both the variable flow channel and the rotating nozzle blade, solves the above problems in the variable flow channel and the rotating nozzle blade, and generates an innovative variable geometry solution. Moreover, compared with the full-length guide blade structure in the conventional technology, the structure having the slotted guide blades and the structure having the long guide blades and the short guide blades in the present application are capable of changing the intake angle, widening an high-speed flow range, and compromising the turbine performance in the case that the engine operates at a high speed and at a low speed, and fixed guide blades are employed to achieve the regulating of the intake angle which may be achieved simply by rotatable nozzle blades. Therefore, the efficiency of the turbine is improved significantly, backflow of the gas flow is reduced due to the presence of the guide blades, thereby not only is the efficiency of the turbine improved, but also is the gas flow smooth, which avoids gas flow disturbance at the throat and greatly reduces fuel consumption in a whole match line.

DETAILED DESCRIPTION

The present application will be described in further detail below in conjunction with the drawings and specific embodiments, so as to enable those skilled in the art to better understand the technical solutions of the present application.

Figure 1:
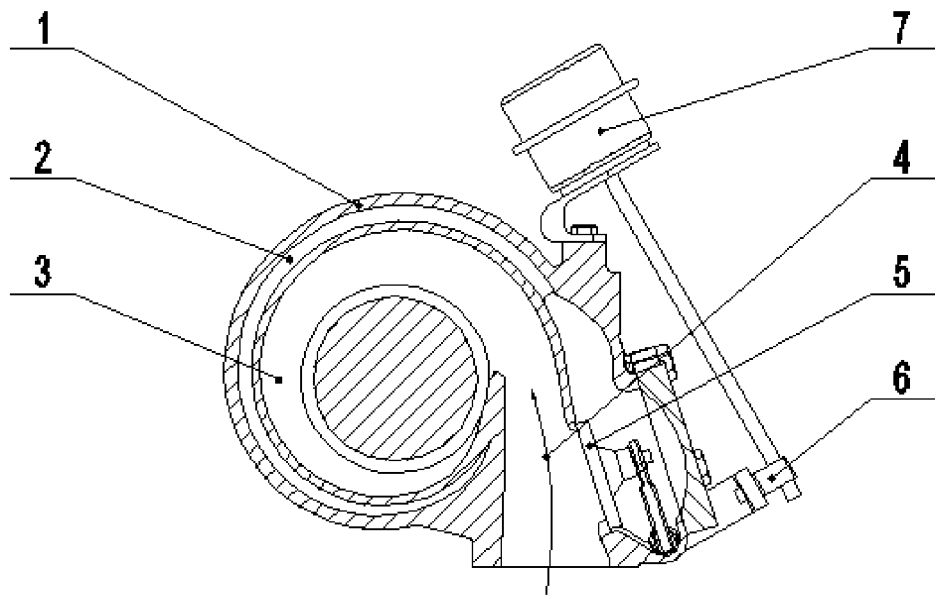
FIG. 1 is a principle diagram of a valve of a variable geometry turbocharger having a double-layer flow channel according to the background part of the present application in a closed state.
Figure 2:
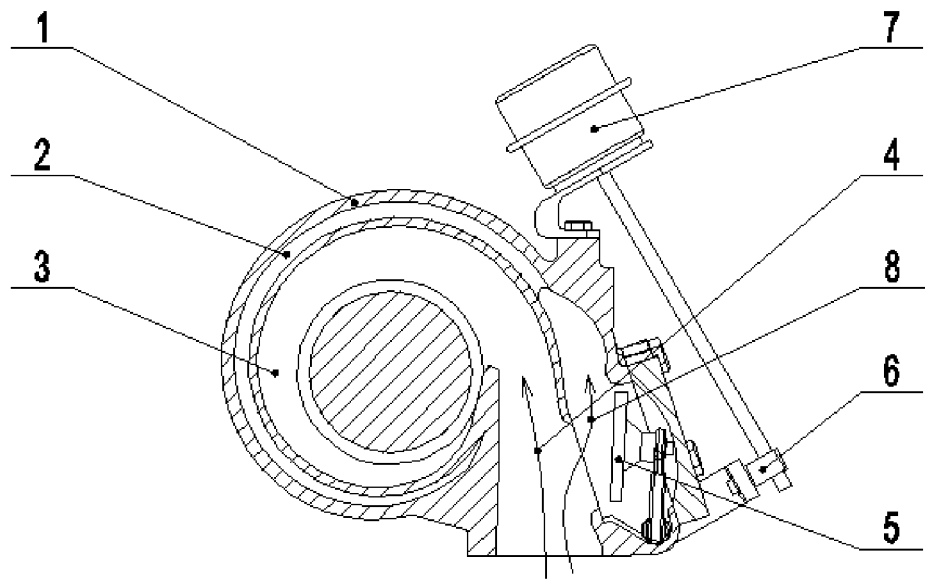
FIG. 2 is a principle diagram of a valve of a variable geometry turbocharger having a double-layer flow channel according to the background part of the present application in an open state.
Figure 3:
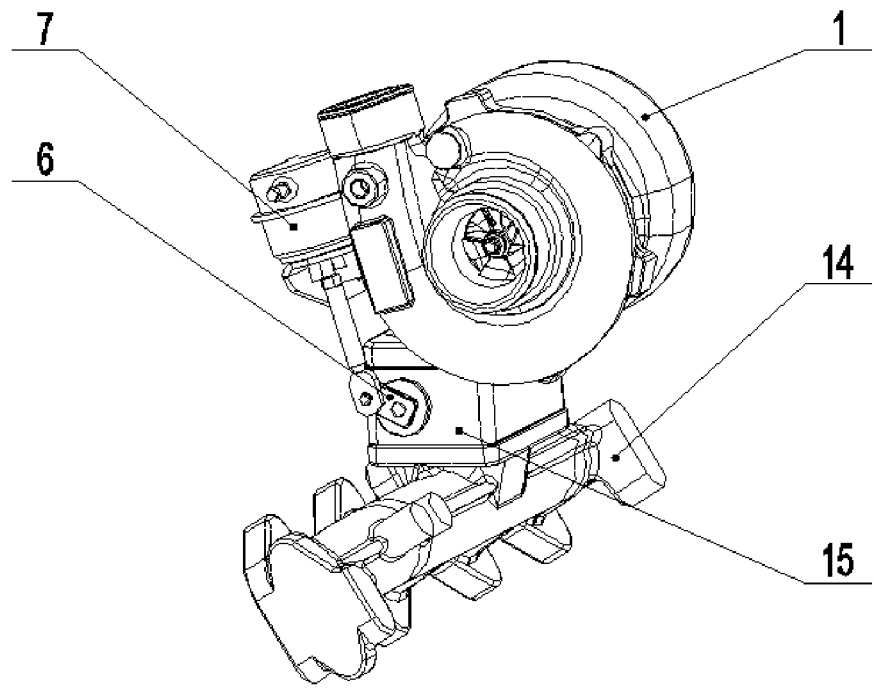
FIG. 3 is a schematic overall installation view according to a first embodiment of the present application showing connection of a turbine with an exhaust pipe.
Figure 4:
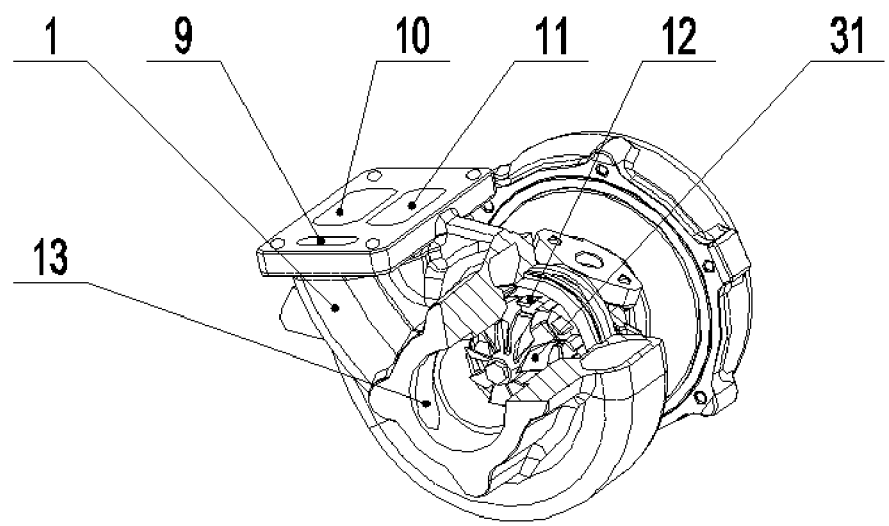
FIG. 4 is a schematic structural diagram of the turbine according to the first embodiment of the present application mainly showing a position of an intake gas end face at a turbine-end and an internal power turbine.
Figure 5:
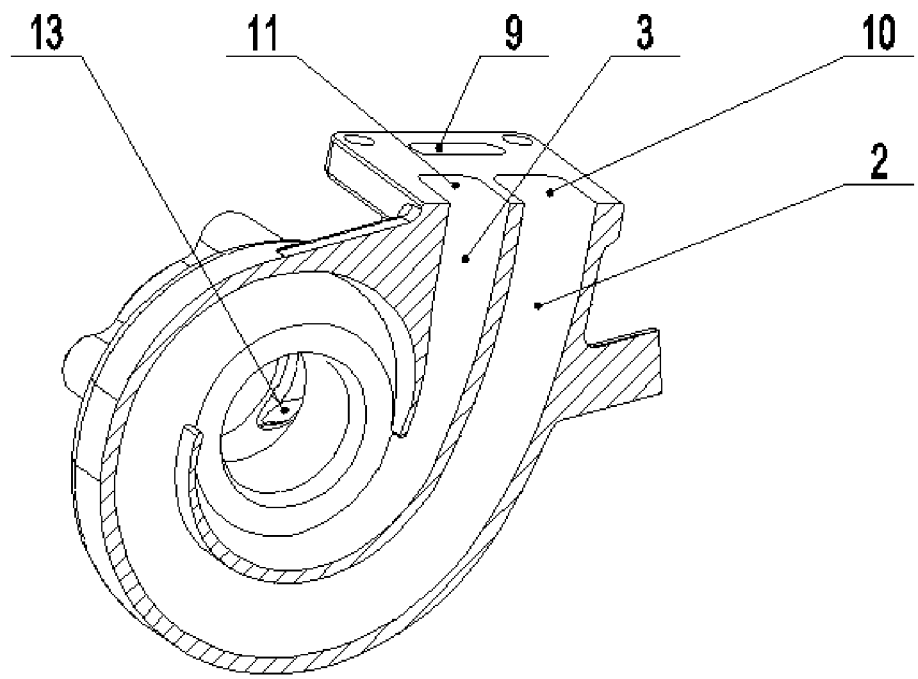
FIG. 5 is a schematic structural diagram of a turbine housing according to the first embodiment of the present application.

In a first embodiment, as shown in FIGS. 3, 4 and 5, a variable geometry turbine having a wastegate, includes a turbine housing 1, a power turbine 31, a valve seat 15, an exhaust pipe 14 and control accessories, and the valve seat 15 is arranged between the exhaust pipe 14 and the turbine housing 1. In order to ensure effective operation, the turbine housing 1, the valve seat 15, and the exhaust pipe 14 are sealingly connected together.

An inner intake gas flow channel 3 and an outer intake gas flow channel 2 are arranged in the turbine housing 1. Exhaust gas discharged from the exhaust pipe 14 of an engine can enter into the inner intake gas flow channel 3 and the outer intake gas flow channel 2. In the present embodiment, each of the inner intake gas flow channel 3 and the outer intake gas flow channel 2 is not a full circumference structure. As shown in FIG. 5, the inner intake gas flow channel 3 carries intake gas, from 0° to 150°~230°, of the power turbine, and the outer intake gas flow channel 2 carries intake gas from 150°~230° to 360°. It is indicated by simulation analysis and practice that efficiency in various operating conditions is the best through such angle setting.

An end face part (i.e., an intake gas end face of the turbine housing 1) on the turbine housing, where the turbine housing 1 is connected to the valve seat 15, is provided with a turbine housing outer flow channel inlet 10 and a turbine housing inner flow channel inlet 11, which are communicated with the outer intake gas flow channel 2 and the inner intake gas flow channel 3, respectively. The exhaust gas discharged from the exhaust pipe 14 may flow into the power turbine 31 via the outer intake gas flow channel 2 and the inner intake gas flow channel 3 from the turbine housing outer flow channel inlet 10 and the turbine housing inner flow channel inlet 11, so as to rotate the power turbine 31. Therefore, a compressor of a turbocharger is driven to rotate for supercharging the intake gas.

| | | | |
|---|---|---|---|
| 1 | turbine housing, | 2 | outer intake gas flow channel, |
| 3 | inner intake gas flow channel, | 4 | inner flow channel flowing direction, |
| 5 | regulating valve, | 6 | valve pin piece assembly, |
| 7 | control actuator, | 8 | outer flow channel flowing direction, |
| 9 | turbine housing wastegate inlet, | 10 | turbine housing outer flow channel inlet, |
| 11 | turbine housing inner flow channel inlet, | 12 | slotted guide blade, |
| 13 | turbine housing wastegate outlet, | 14 | exhaust pipe, |
| 15 | valve seat, | 16 | exhaust pipe wastegate outlet, |
| 17 | exhaust pipe gas outlet, | 18 | valve seat inner flow channel interface, |
| 19 | valve seat outer flow channel interface, | 20 | valve seat wastegate outlet, |
| 21 | wastegate valve bushing, | 22 | regulating valve bushing, |
| 23 | valve seat gas inlet, | 24 | valve seat wastegate inlet, |
| 25 | regulating face, | 26 | wastegate valve, |
| 27 | spring, | 28 | regulating rod, |
| 29 | guide groove, | 30 | guide blade support disc, |
| 31 | power turbine, | 32 | long guide blade, |
| 33 | short guide blade, | 34 | trailing edge, |
| 35 | leading edge, | 36 | cut-away line, |
| 37 | wastegate valve assembly, | 38 | upper housing, |
| 39 | upper and lower housing gasket, | 40 | gasket of wastegate valve assembly, |
| 41 | lower housing, | 41a | assembly wastegate outlet, |
| 42 | wastegate valve support shaft, | 43 | guide bushing, |
| 44 | bolt, | 45 | screw, |
| 46 | end cap, | 47 | cooperating and regulating face, |
| 47a | axial projection, | | |
| 48 | control actuator of wastegate valve. | | |

A wastegate pipeline is also provided in the turbine housing 1. The wastegate pipeline is in parallel with the outer intake gas flow channel 2 and the inner intake gas flow channel 3 but does not pass through the power turbine 31. That is, a part of the exhaust gas can flow towards the wastegate pipeline, and then is discharged to the outside, which does not rotate the power turbine 31.

Meanwhile, the end face part on the turbine housing 1, where the turbine housing 1 is connected to the valve seat 15, is further provided with a turbine housing wastegate inlet 9, which is communicated with the wastegate pipeline. A turbine housing wastegate outlet 13 communicating with the wastegate pipeline is arranged on an inner hole wall of an exhaust end of the turbine housing 1.

Figure 7:
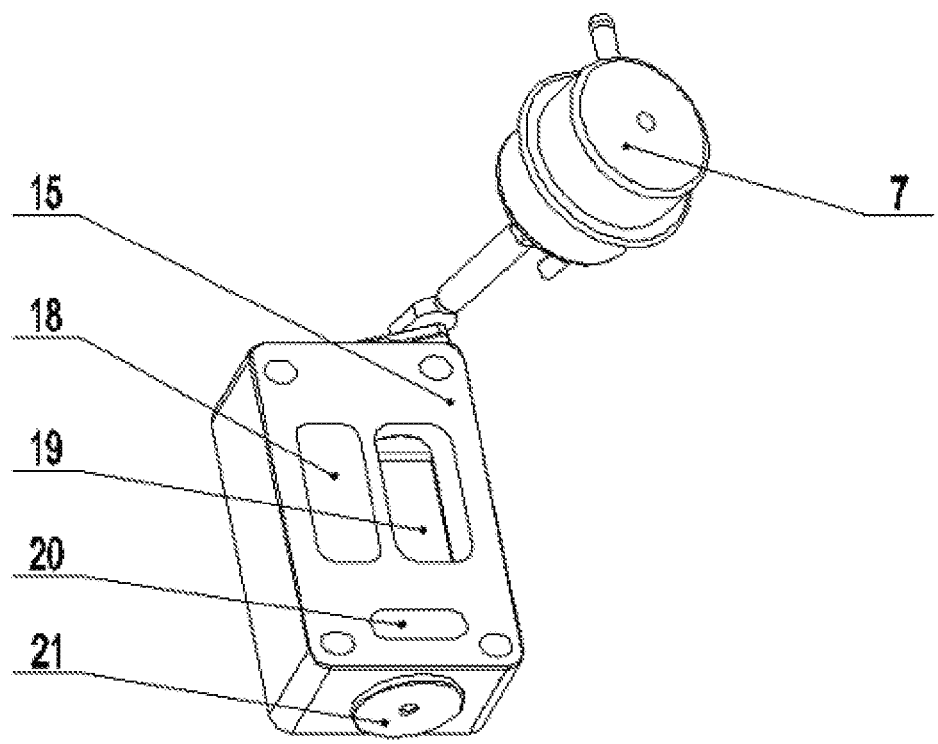
FIG. 7 is a schematic structural diagram of a regulating valve according to the first embodiment of the present application in which a control actuator and a valve seat are mounted and cooperated with each other.
Figure 8:
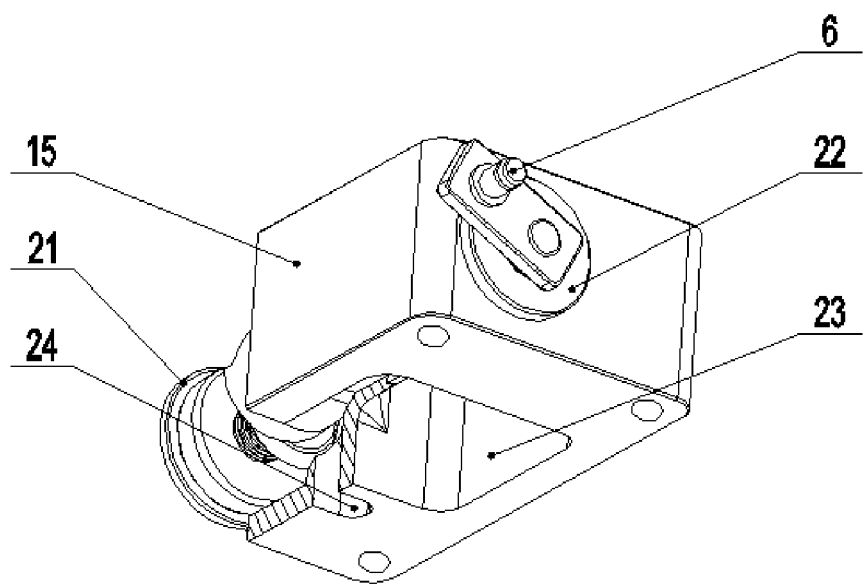
FIG. 8 is a schematic structural diagram of the valve seat according to the first embodiment of the present application.

The valve seat 15 is provided with a valve seat inner flow channel interface 18, a valve seat outer flow channel interface 19 and a valve seat wastegate outlet 20, which are communicated with the turbine housing inner flow channel inlet 11, the turbine housing outer flow channel inlet 10 and the turbine housing wastegate inlet 9, respectively. The valve seat 15 is further provided with a valve seat gas inlet 23 and a valve seat wastegate inlet 24. In FIGS. 7 and 8, the valve seat inner flow channel interface 18, the valve seat outer flow channel interface 19 and the valve seat wastegate outlet 20 are arranged at the top of the valve seat 15, and the valve seat gas inlet 23 and the valve seat wastegate inlet 24 are arranged at the bottom of the valve seat 15.

Figure 6:
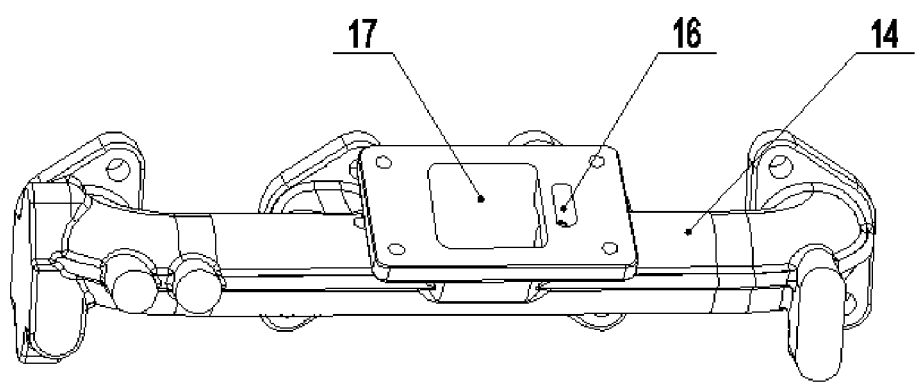
FIG. 6 is a schematic structural diagram of an exhaust pipe according to the first embodiment of the present application.

Accordingly, as shown in FIG. 6, the exhaust pipe 14 is provided an exhaust pipe gas outlet 17 and an exhaust pipe wastegate outlet 16. The exhaust pipe gas outlet 17 is in communication with the turbine housing outer flow channel inlet 10 and the turbine housing inner flow channel inlet 11 through the valve seat 15, and the exhaust pipe wastegate outlet 16 is in communication with the turbine housing wastegate inlet 9 through the valve seat 15.

A part of the exhaust gas discharged from the exhaust pipe 14 flows from the exhaust pipe gas outlet 17, and flows into the turbine housing outer flow channel inlet 10 and the turbine housing inner flow channel inlet 11 through the valve seat 15. After being distributed, the part of the exhaust gas enters into the power turbine 31.

The other part of the exhaust gas flows from the exhaust pipe wastegate outlet 16, and flows into the turbine housing wastegate inlet 9 connected with the valve seat 15 together through the valve seat 15, and flows out of the turbine housing wastegate outlet 13. In this way, the exhaust gas is discharged from the turbine housing 1 directly without passing through the power turbine 31.

As shown in FIGS. 7, 8, 9, and 10, the valve seat inner flow channel interface 18, the valve seat outer flow channel interface 19 and the valve seat wastegate outlet 20 are arranged on the valve seat 15. Two ends of the valve seat inner flow channel interface 18 are in communication with the turbine housing inner flow channel inlet 11 and the exhaust pipe gas outlet 17, respectively, and two ends of the valve seat outer flow channel interface 19 are in communication with the turbine housing outer flow channel inlet 10 and the exhaust pipe gas outlet 17, respectively.

The valve seat wastegate outlet 20 and the valve seat wastegate inlet 24 are in communication with the turbine housing wastegate inlet 9 and the exhaust pipe wastegate outlet 16, respectively.

In the present embodiment, the valve seat 15 is also provided with a regulating valve 5 for regulating an intake gas flow of the outer intake gas flow channel 2.

Specifically, the regulating valve 5 is mounted in the valve seat 15 by a regulating valve bushing 22, and one end of the regulating valve 5 is connected with a valve pin assembly 6, and the regulating valve 5 is in transmission connection with the control accessories through the valve pin assembly 6.

The control accessory includes a control actuator 7 connected with the valve pin piece assembly 6. The control actuator 7 and the valve pin assembly 6 are arranged outside the turbine housing 1.

Figure 9:
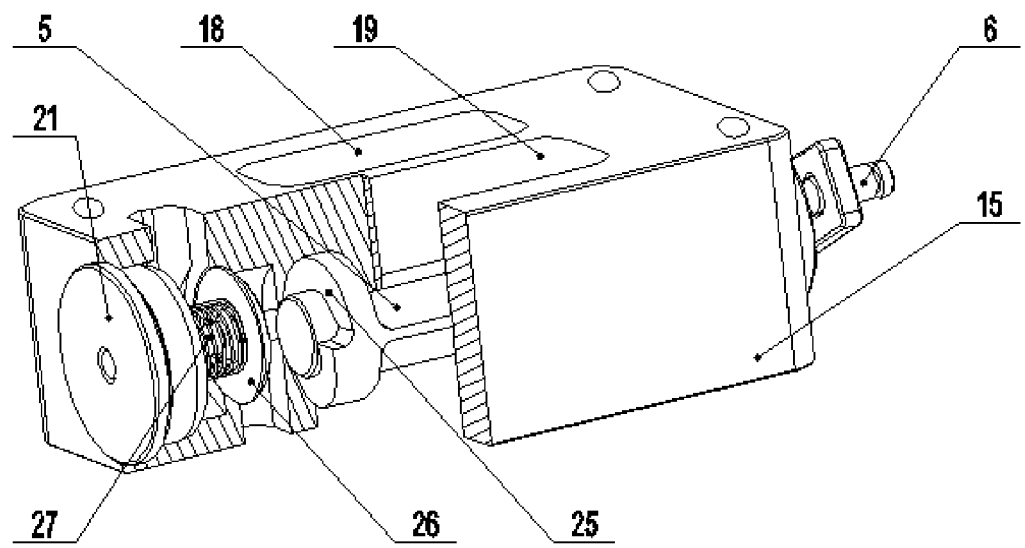
FIG. 9 is a perspective diagram of the valve seat according to the first embodiment of the present application.
Figure 10:
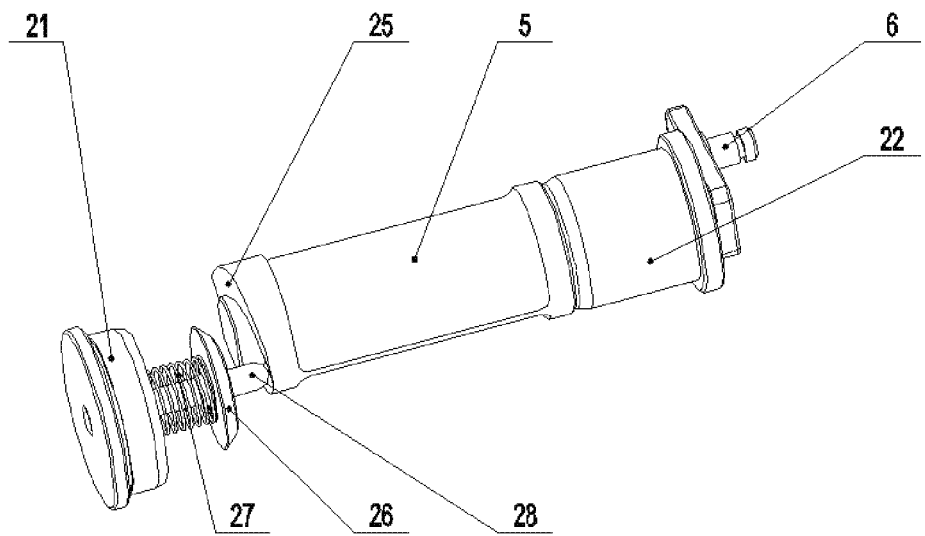
FIG. 10 is a schematic structural diagram of a regulating valve according to the first embodiment of the present application showing that the regulating valve is cooperated with a wastegate valve.

The regulating valve 5 preferably employs a rotatable center valve, as shown in FIG. 10. The regulating valve 5 is rotatable about a central axis thereof. In FIG. 9, the channel between the valve seat outer flow channel interface 19 and the valve seat gas inlet 23 is completely blocked by a valve body of the regulating valve 5. When the regulating valve 5 is rotated by the valve pin piece assembly 6, both sides of the regulating valve 5 and an inner wall of the above channel forms an opening, thereby allowing the exhaust gas to pass through.

Compared with the deflation valve structure shown in the background, in the center valve structure, there is a directly proportional relationship between an opening degree and a rotation angle during the rotation, and an intake gas amount and an intake pressure can be precisely controlled so as to well match with the engine and precisely control the EGR rate, thus the engine can meet the emission standards.

The turbine according to the above embodiment is provided with the wastegate pipeline for bypassing the power turbine 31, and is further provided with a wastegate valve 26 for controlling the communication and cutting off of the wastegate pipeline. Further, when the intake gas amount of the exhaust gas entering into the turbine exceeds a predetermined value, the wastegate valve is opened such that a part of the exhaust gas can be discharged via the wastegate pipeline. Therefore, when the engine operates at a high speed, the wastegate valve 26 can be opened such that a part of the exhaust gas can be discharged via the wastegate pipeline, thereby avoiding overspeed of a supercharger. Therefore, there is no need to set the outer intake gas flow channel 2 to have a large cross sectional area of for avoiding the overspeed of the supercharger at the high speed, and the outer intake gas flow channel 2 can be set to have a small cross sectional area, as long as turbine drive performance and EGR circulation at a middle speed under medium load can be ensured. Moreover, in the case that the regulating valve is opened when the engine is operated from a low speed and a low load to a middle speed working condition, the expansion loss is reduced due to a small cross sectional area difference between the inner intake gas flow channel and the outer intake gas flow channel.

Further, the wastegate valve 26 and the regulating valve 5 may be linked and configured to, when the regulating valve 5 is opened to a predetermined angle, the wastegate valve 26 is opened, at this time, the intake gas amount reaches a predetermined value.

A specific linking mode can be described as follows.

As shown in FIG. 9, one end of the regulating valve 5 is mounted to the valve seat 15 through the regulating valve bushing 22, and the other end of the regulating valve 5 is provided with a regulating face 25 which is in a spiral structure. An axial height of the regulating face 25 spirally increases around an axis center of the regulating face 25.

The wastegate valve 26 is arranged in the wastegate pipeline, which can work in a way of fitting with the regulating valve 5. The wastegate valve 26 is mounted in the valve seat 15 through the wastegate valve bushing 21. A spring 27 is mounted between the wastegate valve 26 and the wastegate valve bushing 21. One end, close to the regulating valve 5, of the wastegate valve 26 is provided with a regulating rod 28, which cooperates with the regulating face 25. As shown in FIG. 9, the wastegate valve 26 and the regulating valve 5 are arranged in parallel in an axial direction, and the regulating rod 28 is located towards the regulating face 25 and makes contact and cooperates with the regulating face 25.

In operation, the control actuator 7 is configured to push the valve pin piece assembly 6, and the valve pin piece assembly 6 drives the regulating valve 5 to rotate, thus the intake gas amount of the outer intake gas flow channel 2 is regulated. In the case that a rotation angle reaches a specified value, the regulating rod 28 may be moved in a spiral direction of the regulating face 25, and the regulating face 25 of the regulating valve 5 may push the regulating rod 28 to move axially, thus the wastegate valve 26 is opened and compresses the spring 27. In this case, the exhaust gas to be bypassed flows from the valve seat wastegate inlet 24, and then flows into the turbine housing wastegate inlet 9 from the valve seat wastegate outlet 20, and flows out of the turbine housing wastegate outlet 13. When the regulating valve 5 returns to its initial position, the wastegate valve 26 returns to its initial position under the action of an elastic force of the spring 27, and the exhaust gas is no longer bypassed.

A second embodiment is further provided below, which is substantially the same as the first embodiment. In the second embodiment, a different linkage mode is employed, and the structure of the regulating valve 5 is slightly modified (which is described hereinafter) with reference to FIGS. 11-14.

In this embodiment, one end, connected to the valve pin piece assembly 6, of the regulating valve 5 is provided with a regulating face 25, which has a varying axial height. In this case, an end cap 46, which is snap-fitted with the end of the regulating valve 5, is further included, and the end cap 46 may be fixed on a housing of the turbine housing 1, and the end cap 46 includes a structure that cooperates with the regulating face 25 opposite to the end cap 46. The valve pin piece assembly 6 is located outside the end cap 46 and can drive the regulating valve 5 to rotate.

Figure 11:
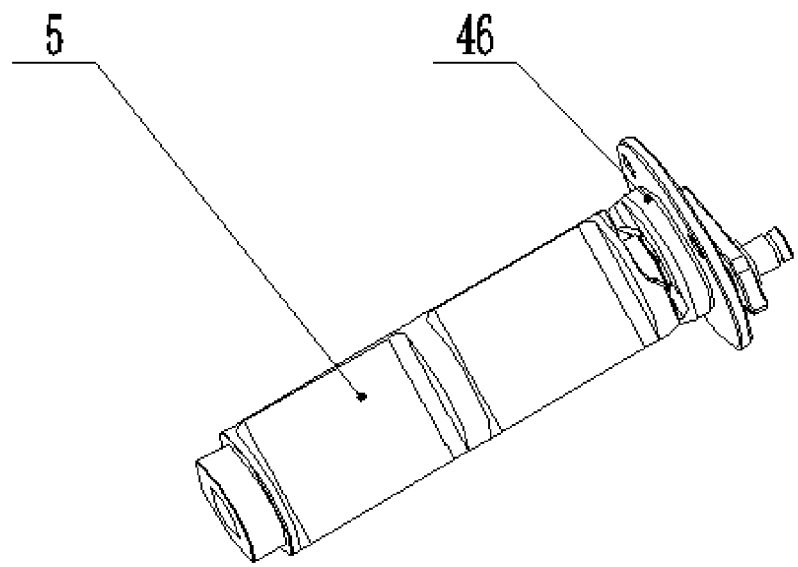
FIG. 11 is a schematic view showing arrangement of the regulating valve and an end cap according to a second embodiment of the present application.
Figure 14:
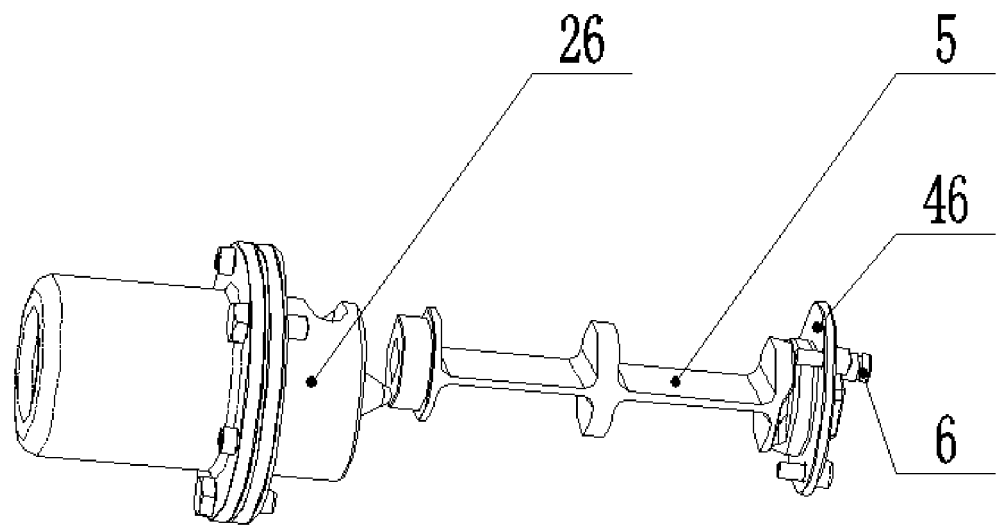
FIG. 14 is a schematic diagram showing that the regulating valve, the end cap, and the wastegate valve according to the second embodiment of the present application are cooperated with each other.

Specifically, in this embodiment, the end cap 46 is provided with a cooperating and regulating face 47 which cooperates with the regulating face 25. The cooperating and regulating face 47 has an axial projection 47*a*. The regulating face 25 is provided with a concave portion arranged in a rotation direction, correspondingly, a convex portion is formed, and the concave portion is relatively smoothly transited to the convex portion. As shown in FIGS. 11 and 14, when the valve pin piece assembly 6 rotates to drive the regulating valve 5 to rotate, the regulating face 25 rotates with respect to the cooperating and regulating face 47. When the axial projection 47*a* slides over the concave portion and makes contact with the convex portion and the regulating face 25 continues rotating, the axial projection 47*a* slowly raises the regulating face 25, and the regulating valve 5 is correspondingly moved in the axial direction.

It is designed that the regulating valve 5 can make contact with the wastegate valve 26 in the axial direction of the regulating valve. In the case that the regulating valve 5 is axially moved under drive of the cooperating and regulating face 47, the wastegate valve 26 is driven to move axially so as to open the wastegate valve 26.

In the linkage setting modes in the above-described two embodiments, the regulating face 25 having a varying axial height is formed on one component, and then a linking portion (such as the regulating rod 28, the axial projection of the cooperating and regulating face 47) cooperating and making contact with the regulating face 25 is arranged on another component, such that the rotational motion is converted into linear motion, thereby achieving linkage control. It can be seen that, in the above embodiments, the regulating face 25 and the linking portion cooperating and making contact with the regulating face 25 are not limited to the above two. For example, the regulating face 25 may be arranged at the wastegate valve 26, while the regulating rod 28 may be arranged at the regulating valve 5. Certainly, the regulating rod 28 is arranged at the wastegate valve 26, which may prevent the regulating face 25 from interfering the exhaust gas flowing, and the regulating face 25 may be arranged at the end cap, while the cooperating and regulating face 47 is arranged at the regulating valve 5.

Figure 12:
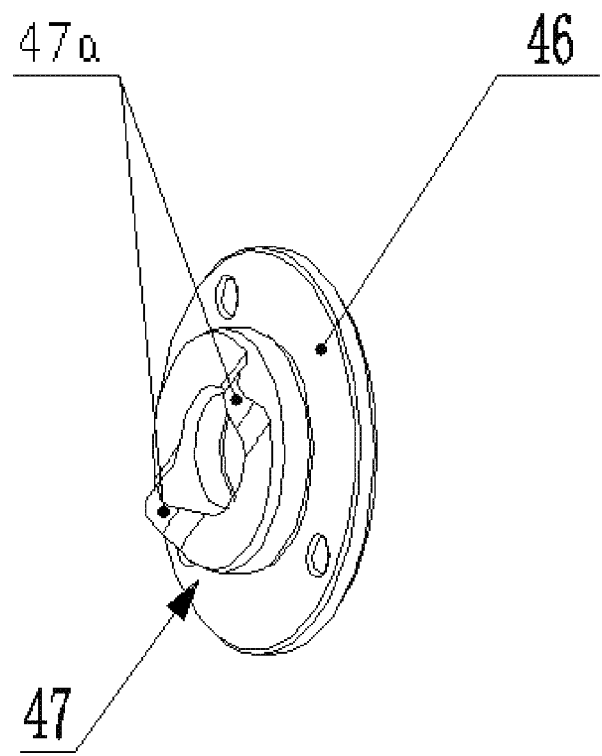
FIG. 12 is a structural diagram of the end cap according to the second embodiment of the present application.
Figure 13:
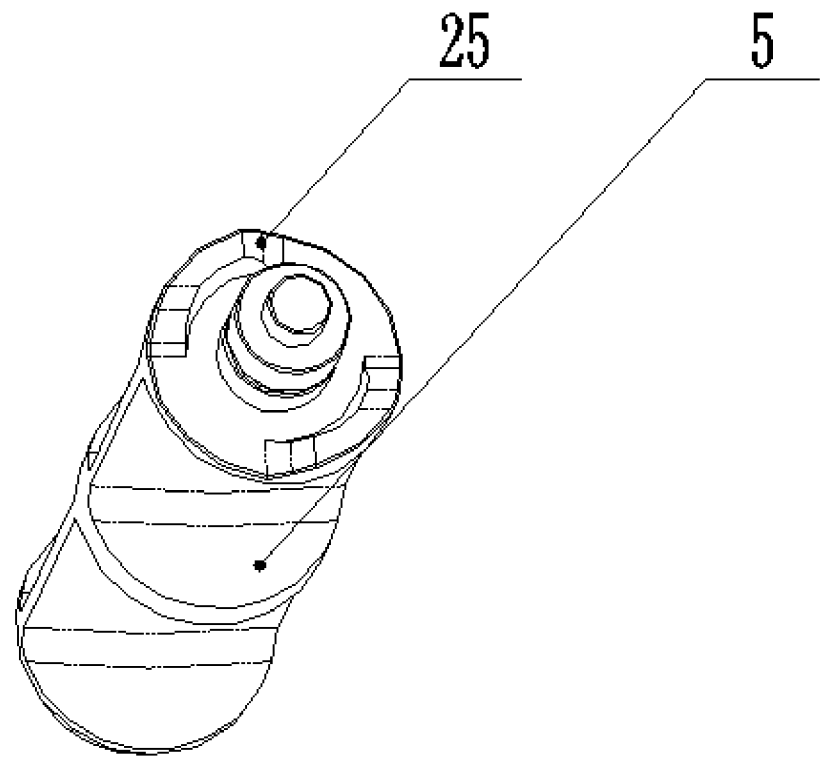
FIG. 13 is a structural diagram of the regulating valve according to the second embodiment of the present application.

The snap-fit between the end cap and the regulating valve 5 described above makes the entire linkage mechanism have good stability. As shown in FIGS. 12 and 13, two axial projections and two concave portions are provided, which are arranged symmetrically along a center line of the end face of the corresponding component. This entire linkage mechanism has better stability and is not easy to be dislocated.

Figure 15:
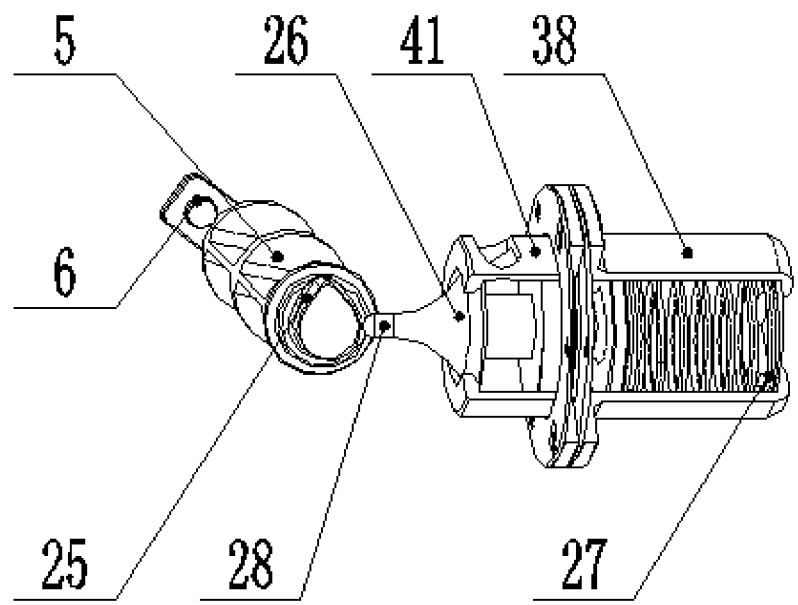
FIG. 15 is a schematic structural diagram showing that a wastegate valve assembly is cooperated with a regulating valve having a cam-type regulating face according to a third embodiment of the present application.

A third embodiment according to the present application is further provided, as shown in FIG. 15, which is substantially the same as the first and second embodiments, and in the third embodiment, a different linkage cooperating mode is employed, and structures of the wastegate valve 26 and the regulating valve 5 are slightly modified, which will be described hereinafter.

One end of the regulating valve 5 is connected to the valve pin piece assembly 6, and the other end of the regulating valve 5 is provided with a cam-type regulating face 25. The wastegate valve 26 is provided with the regulating rod 28, which can make contact and cooperate with a cam edge. The regulating rod 8 moves in the axial direction of the wastegate valve 26 when the regulating valve 5 rotates, thus the valve is opened. Herein, the cam-type regulating face 25 should be designed such that, when the regulating valve rotates to a predetermined angle, the regulating rod 28 makes contact with the cam edge and then moves by the cam edge, so as to meet the above requirement that the wastegate valve 26 is opened when the intake gas amount reaches a specific degree.

In the above embodiments, since the linkage control between the wastegate valve 26 and the regulating valve 5 are realized, only an end cap for the regulating valve 5 is required to be disposed, and a component for controlling the wastegate valve 26 is not required, which leads to a compact and simple structure. Moreover, the wastegate valve 26 is controlled by the changing of the opening degree of the regulating valve 5. The opening and closing control of the wastegate valve 26 can conform to a change in the actual intake gas amount, in this case, the control is more accurate compared with the separate control.

It should be noted that in the above embodiments, the valve seat 15 is provided to mount the components such as the regulating valve 5 and the wastegate valve 26, so as to facilitate mounting of the components and achieve a controllable communication between the turbine housing 1 and the exhaust pipe 14. Another valve setting mode is further provided according to the present application, which has a more compact structure, as shown in FIGS. 15-20.

Figure 20:
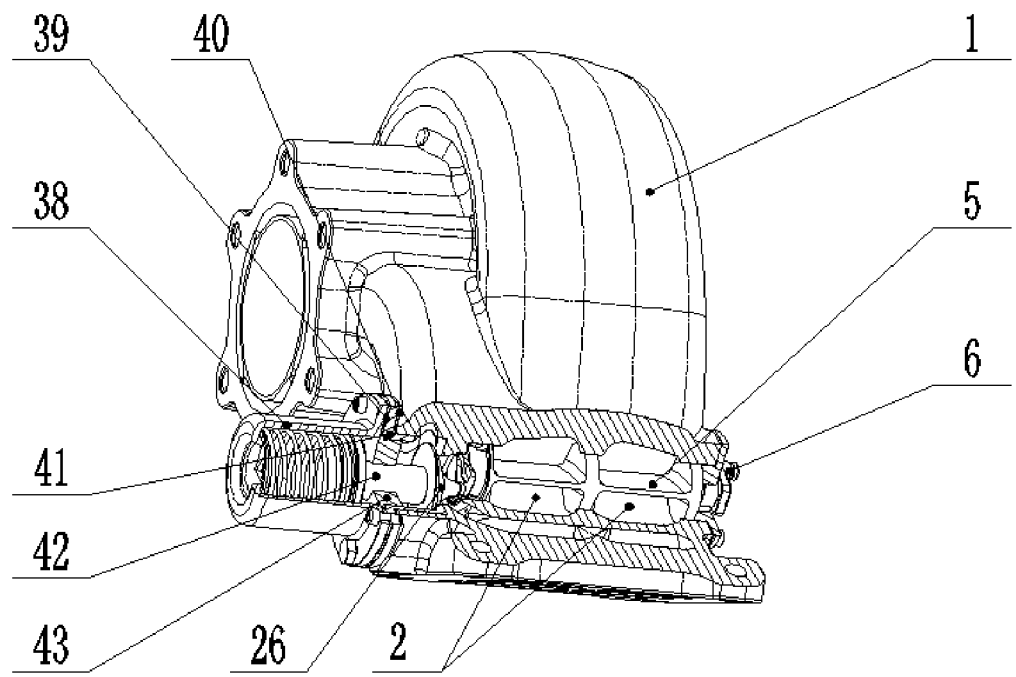
FIG. 20 is a cross-sectional view of the wastegate valve assembly and the regulating valve inserted into the turbine housing in FIG. 18.

In this embodiment, a wastegate valve assembly 37 is provided, which is arranged separately from the regulating valve 5, and the wastegate valve assembly 37 is directly mounted to the turbine housing 1, and the regulating valve 5 is directly mounted in the turbine housing 1. As shown in FIG. 20, a valve body of the regulating valve 5 is directly inserted into the outer intake gas flow channel 2, and an outer periphery of the valve body is sealingly cooperated with an inner wall of the outer intake gas flow channel 2. When the valve body rotates, an opening is formed to communicate the exhaust gas. In the Figure, the regulating valve 5 runs through an intake gas mounting end of the turbine housing 1. One end of the regulating valve 5 is connected to the wastegate valve assembly 37, and the other end of the regulating valve 5 is connected to the valve pin piece assembly 6 which drives the regulating valve 5 to rotate.

In this case, an end face of the intake gas mounting end of the turbine housing 1 can be directly in communication with the exhaust pipe 14. Correspondingly, the exhaust pipe 14 is provided with exhaust ports which correspond to the inner intake gas flow channel 3 and the outer intake gas flow channel 2, respectively.

Figure 16:
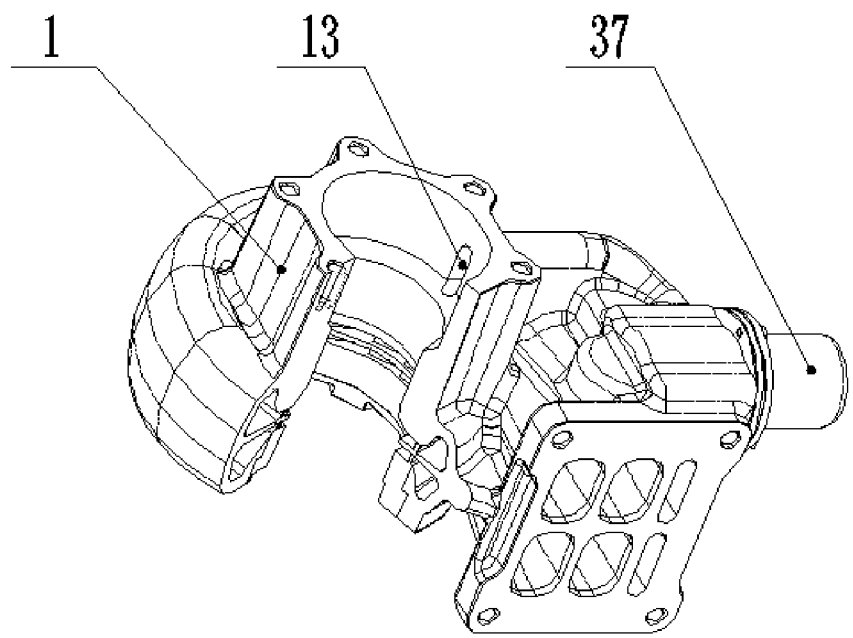
FIG. 16 is a schematic diagram showing arrangement of the wastegate valve assembly mounted in the turbine according to the third embodiment of the present application.

Mounting requirements of the valve are different since linkage modes are different. It may be appreciated by comparing FIGS. 16 and 17 that in the spiral regulating face 25 and axially convex regulating face 25, the wastegate valve 26 and the regulating valve 5 are arranged in parallel in the axial direction, and in the cam-type regulating face 25, the wastegate valve 26 and the regulating valve 5 are arranged to form an angle. In FIGS. 15 and 16, the wastegate valve 26 and the regulating valve 5 are substantially perpendicular to each other.

Figure 18:
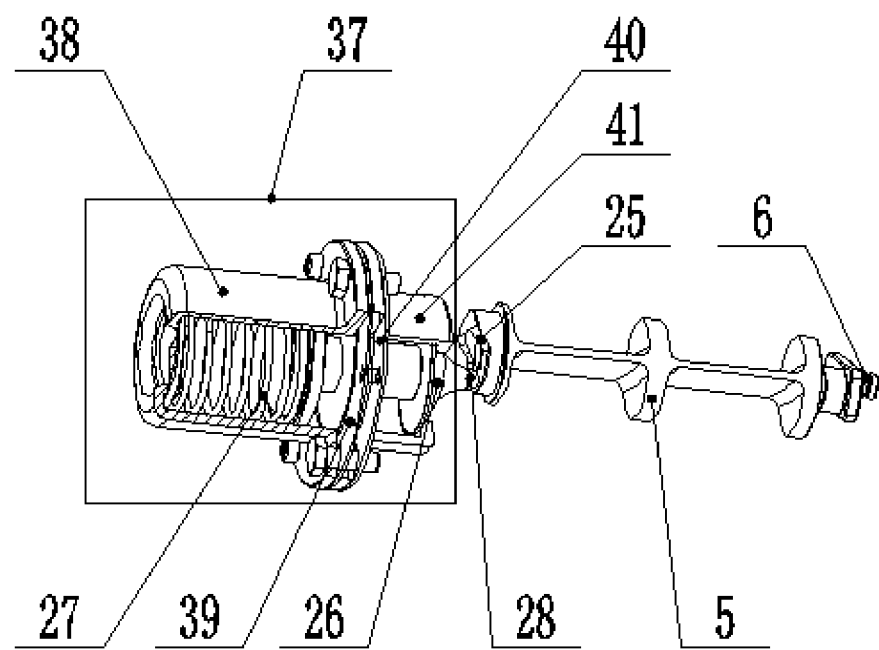
FIG. 18 is a schematic diagram showing that the wastegate valve assembly is cooperated with the regulating valve in FIG. 17.
Figure 19:
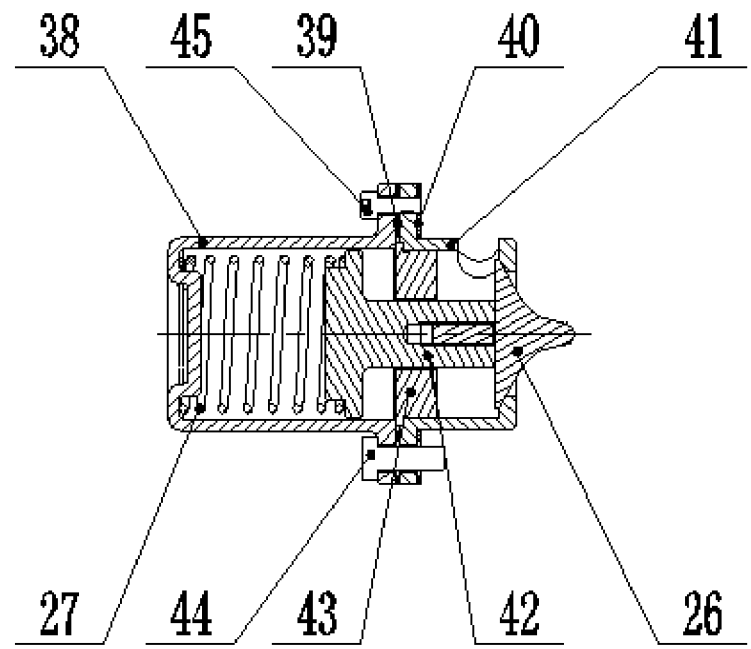
FIG. 19 is an axial cross-sectional view of the wastegate valve assembly in FIG. 18.

As shown in FIGS. 18 and 19, the wastegate valve assembly 37 includes the wastegate valve 26, an upper housing 38 and a lower housing 41. The upper housing 38 and the lower housing 41 are connected to form a valve cavity. A side wall of the lower housing 41 is provided with an assembly wastegate outlet 41a. The wastegate valve 26 may be supported and connected by a wastegate valve support shaft 42. The wastegate valve support shaft 42 is arranged in the valve cavity, and a spring 27 is arranged between the wastegate valve support shaft 42 and an end of the upper housing 38 to provide a reset force. A valve port is arranged at an end of the lower housing 41. When the wastegate valve 26 is opened, the exhaust gas enters into the assembly wastegate outlet 41a via the valve port.

In FIG. 19, a protrusion on an end face of the wastegate valve 26 forms the regulating rod 28, that is, the regulating rod 28 is formed integrally with the wastegate valve 26, which facilitates machining, and having more reliable linkage control.

A guide bushing 43 can also be arranged in the valve cavity of the exhaust gas bypass valve assembly 37, and the wastegate valve support shaft 42 runs through the guide bushing 43. When the wastegate valve 26 moves axially, the wastegate valve support shaft 42 slides along the guide bushing 43, so as to prevent the wastegate valve 26 from deviating from the axial movement, affecting the bypassed exhaust gas. In FIG. 19, the wastegate valve support shaft 42 has a large diameter end to support the spring 27.

Figure 17:
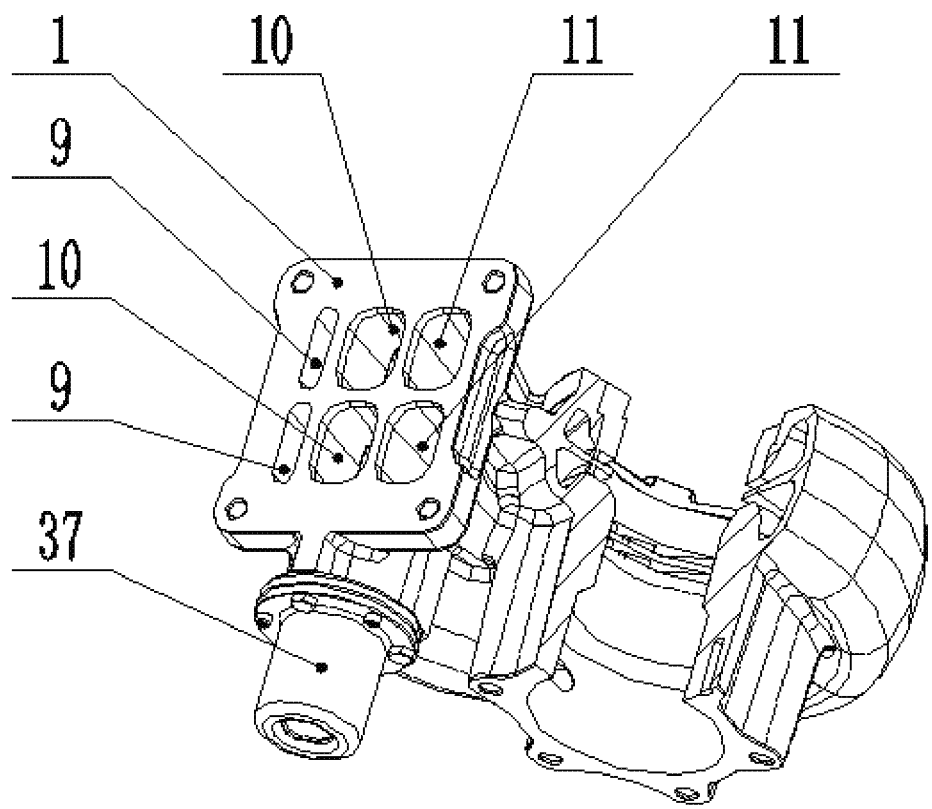
FIG. 17 is a schematic diagram showing that the wastegate valve assembly is cooperated with the regulating valve having a spiral regulating face and is mounted on the turbine according to the third embodiment of the present application.

The turbine according to the above embodiments is applicable not only to a four-cylinder engine but also to a six-cylinder engine. The structure in FIGS. 4 to 10 corresponds to the four-cylinder engine. Two sets of inner intake gas flow channels 3, the outer intake gas flow channels 2 and the wastegate pipelines are required for the six-cylinder engine. As shown in FIGS. 16 and 17, the intake gas mounting end face of the turbine housing 1 are correspondingly provided with two turbine housing wastegate inlets 9, two turbine housing outer flow channel inlets 10 and two turbine housing inner flow channel inlets 11. In this case, two sets of the valves described above may be arranged.

A valve structure for the six-cylinder engine is further provided herein, and the valve structure has a more compact structure, a small volume, and simple and accurate control.

As shown in FIGS. 13, 18 and 20, the regulating valve 5 includes two valve bodies connected with each other. After being inserted into the turbine housing 1, the two valve bodies correspondingly control the intake gas amount of the two outer intake gas flow channels 2, respectively. The regulating valve 5 is still mounted in linkage with a wastegate valve 26. That is, a valve body is added in the original regulating valve 5, in this case, the regulating valve can be applied to the six-cylinder engine, in which one valve is used to control the intake amount of the two flow channels, in this way, it is easy to achieve precise control.

Figure 21:
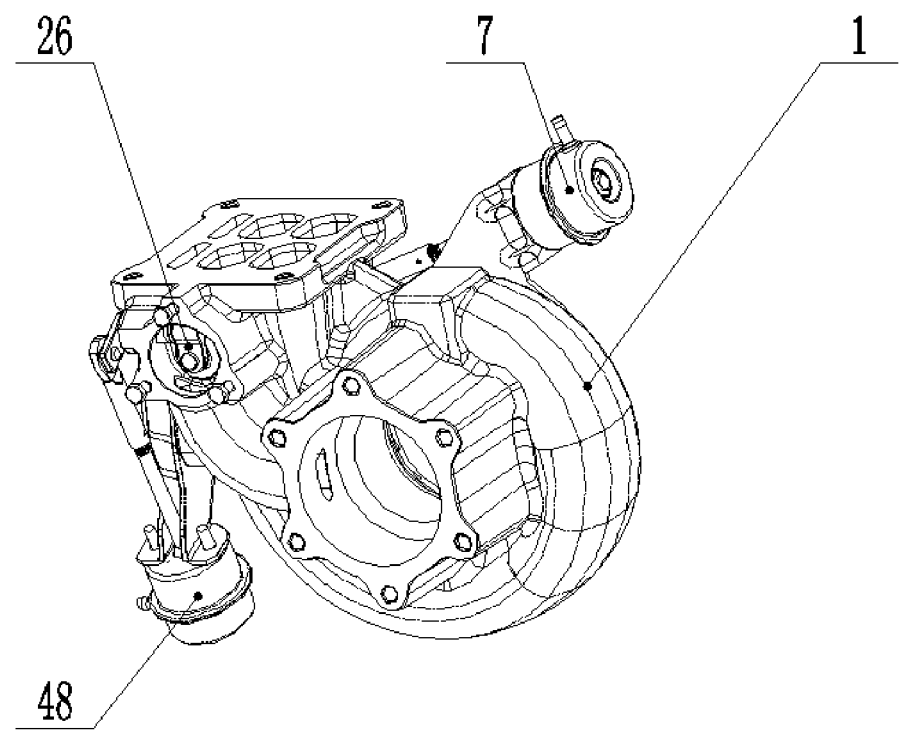
FIG. 21 is a schematic view showing arrangement of the turbine according to a fourth embodiment of the present application.
Figure 22:
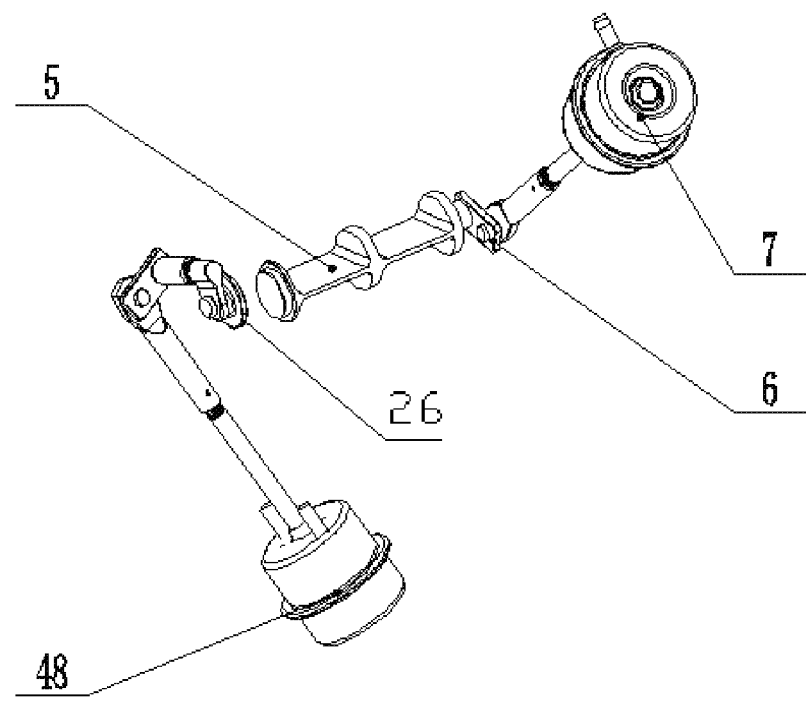
FIG. 22 is a schematic structural diagram of the regulating valve and the wastegate valve according to the fourth embodiment of the present application.

Multiple linkage modes between the regulating valve 5 and the wastegate valve 26 are provided according to the above-described embodiments. It may be appreciated that the wastegate valve 26 may also be separately controlled, as shown in the fourth embodiment in FIGS. 21 and 22. Similar to the deflation valve of the outer intake gas flow channel in the background, the wastegate valve 26 may be equipped with a wastegate valve control actuator 48. Thus, the opening and closing of the wastegate valve 26 may be controlled depending on the intake gas signal. The operating principle of the wastegate valve control actuator 48 is same as the operating principle of the control actuator 7. As shown in FIG. 22, a rod end of the wastegate valve control actuator 48 may be lengthened under gas pressure and, thus, the pin piece assembly is driven to rotate and the wastegate valve 26 is further driven to rotate so as to close or open the valve port.

It should be noted that in the above embodiments, in the case that the regulating valve 5 and the wastegate valve 26 are linked, the wastegate valve 26 can be reset into the initial state by the spring 27 when a linkage force is removed. The wastegate valve 26 is opened simply and reliably by a linkage mode in which the spring 27 is combined with the multiple regulating faces 25 described above. It will be appreciated that in the case that the opening and closing of the wastegate valve 26 is controlled by the wastegate valve control actuator 48, the reset device is not required. In practice, in addition to the mentioned linkage implementation of the wastegate valve 26, there are other implementations that can achieve the linkage of the wastegate valve 26 and the regulating valve 5 without providing a return structure. For example, the end of the regulating valve 5 is provided with a gear, the wastegate valve 26 is provided with a rack, alternatively, the regulating valve 5 is provided with a nut, and the wastegate valve 26 is provided with a screw. In practice, the above-described setting mode is simple and not easy to interfere the valve port.

Moreover, an intake gas mode for driving the power turbine 31 is modified in the present application.

Figure 23:
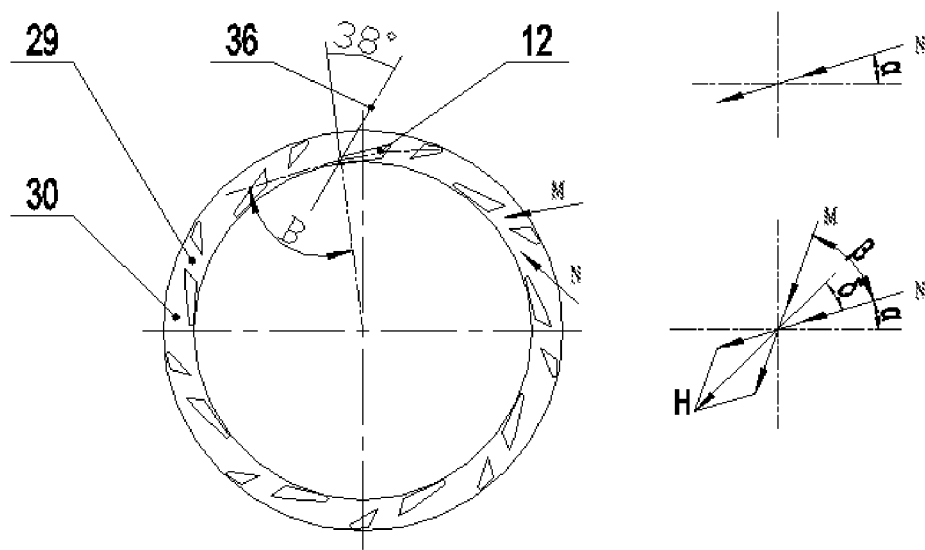
FIG. 23 is a schematic structural diagram of slotted guide blades according to the first embodiment of the present application.

As shown in FIGS. 4 and 23, a non-blade nozzle is arranged at a position in the turbine housing 1 which is close to the power turbine 31, so as to guide the exhaust gas discharged from the inner intake gas flow channel 3 and the outer intake gas flow channel 2 into the blade of the power turbine 31. In the embodiment, a slotted guide blade 12 is mounted at a position close to the non-blade nozzle, and a guide blade support disc 30 is mounted at a position in the turbine housing 1 which is close to the power turbine 31, and multiple slotted guide blades 12 are arranged on the guide blade support disc 30. The multiple slotted guide blades 12 are arranged uniformly in a shape of a ring, in order to achieve uniform intake gas.

A guide groove 29 is arranged in the middle of each of the slotted guide blades 12. That is, multiple guide blades 29 which project from a torus of the guide blade support disc 30 are circumferentially arranged on the torus, and then the guide groove 29 running through the guide blade is arranged, in this way, the slotted guide blades are formed. An arrangement angle B of the slotted guide blades 12 (as shown in FIG. 23, the angle refers to an included angle between a tangent of a center axis of the slotted guide blade 12 and a connection line between a tip end of the slotted guide blade 12 close to a center of the guide blade support disc 30 and a center of the guide blade support disc 30) may range from 68° to 80°, and the two groove edges of the guide groove 29 may be formed by a cut-away line 36 (a connection line between the tip end of the slotted guide blade 12 close to the center of the guide blade support disc 30 and the center line of the guide blade support disc 30) rotating around the center of the guide blade support disc 30, in which the smallest width of the groove is 3 mm.

Figure 24:
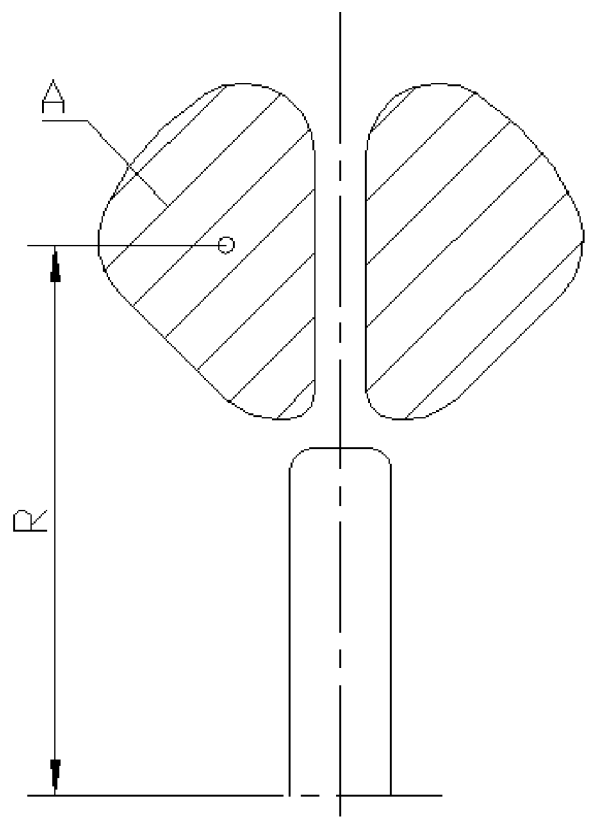
FIG. 24 is a schematic diagram of A and r of the turbine housing.

The slotted guide blade 12 is in a form of a gas-solid combined nozzle, i.e., the slotted guide blade 12 combines the functions of the gas flow and the solid nozzle. When the engine operates at a low speed and a low load, the inner intake gas flow channel 3 of the turbine works. It can be understood by those skilled in the art that an intake gas angle of the inner intake gas flow channel 3 is obtained according to the formula $\tan(\alpha)=2\pi b/(A/r)$, where b is a turbine inlet width, which is a fixed value, and thus the intake gas angle is determined based on A/r of the inner intake gas flow channel 3, where A is the zero section area of the turbine housing 1 and r is a distance from a centroid of the zero cross section to an axis center of the turbine housing 1, as shown in FIG. 24, which is a schematic view of A and r of the turbine housing.

A guide blade angle (an included angle between the two slotted guide blades 12) is designed based on the intake angle of the inner intake gas flow channel 3, that is, the guide blade angle is substantially the same as the intake angle. In this way, in the case that the gas enters into the slotted guide blades 12 along the intake gas inner flow channel 3, and then enters into the power turbine 31 along the slotted guide blades 12, there is no turning loss, and the aerodynamic efficiency is high.

With the gradual increase of a rotation speed of the engine, the gas flow increases, and the outer intake gas flow channel 2 takes part in the gas intake process as the regulating valve 5 is opened. An intake gas angle of the outer intake gas flow channel 2 is also determined based on the A/r of the outer intake gas flow channel 2. An angle of the guide groove 29 is designed based on the intake gas angle of the outer intake gas flow channel 2, which ensures that the angle of the guide groove 29 is substantially the same as the intake gas angle of the outer intake gas flow channel 2. The gas enters into the diversion guide 29 along the outer intake gas flow channel 2, and then enters into the power turbine 31 along the guide groove 29, and therefore, impact loss and turning loss when a complete guide blade is installed (there is no the guide groove 29) is avoided, thereby not only improving efficiency, but also widening the flow rate. Moreover, as the increase of a gas flow velocity, a radial velocity component of the gas flow increases quickly, therefore, a flow rate at a high speed phase is widened apparently due to the presence of the guide groove 29.

FIG. 23 further includes a schematic diagram of gas flow. When the engine operates at a low speed and a low load, the gas flow enters into the power turbine 31 only in a N direction (an angle α, that is, the intake gas angle). As the increase of a rotation speed of the engine, the gas flow is converged into the H direction from an M direction (an angle β, i.e., the intake gas angle) and the N direction to act on the power turbine 31, where δ is a change range of a direction of the gas flow flowing into the power turbine 31.

An exhaust gas flow path will be described by taking an embodiment in which the valve seat 15 is provided as an example.

In an actual operation, when the engine operates at a low speed and a low load, the regulating valve 5 is closed, the intake gas flows into the power turbine 31 through the exhaust pipe 14, the valve seat gas inlet 23, the valve seat inner flow channel interface 18, the turbine housing inner flow channel inlet 11, the inner intake gas flow channel 3 and the channel between the adjacent slotted guide blades 12, so as to drive the power turbine 31 to work.

In this case, the gas flow flows towards the power turbine 31 along an intermediate zone between the two slotted guide blades 12, so as to drive the power turbine 31 to work. Since only the inner intake flow passage 3 works, the section is small, and the gas flow enters into the slotted guide blades 12 only along the guide blade angle, that is, the N direction in FIG. 20, therefore, the gas flow is concentrated, thereby improving the pre-turbine pressure and increasing the EGR rate.

In the case that the rotation speed and load of the engine gradually increase, the regulating valve 5 is opened, a part of gas flow flows through the regulating valve 5, and then flows into the power turbine 31 through the valve seat outer flow channel interface 19, the turbine housing outer flow channel inlet 10, the outer intake gas flow channel 2 and the slotted guide blade 12, so as to meet the requirement for the gradually increasing of the flow rate. In this process, by regulating the opening degree of the regulating valve 5, the pre-turbine pressure may be regulated for determining an appropriate EGR rate.

In a process of regulating the regulating valve 5, after the regulating valve 5 is rotated to a certain angle (usually corresponds to the high-speed phase of the engine), the pushing force is applied to the regulating rod 28 by the regulating face 25, and the regulating rod 28 drives the wastegate valve 26 to compress the spring 27, and then the wastegate pipeline is opened, and the exhaust gas flows out through the exhaust pipe wastegate outlet 16, the valve seat wastegate inlet 24, the valve seat wastegate outlet 20, the turbine housing wastegate inlet 9 and turbine housing wastegate outlet 13. In this way, a part of exhaust gas energy is discharged, thereby ensuring that the pre-turbine pressure of the supercharger is not too large when the engine operates at the high speed under high load.

Moreover, as the intake gas amount increases, the intake gas enters along the guide groove 29 on the slotted guide blade 12, i.e., along the M direction in FIG. 23. In this case, the intake gas flows in the M direction and the N direction simultaneously, thereby avoiding gas flow blockage in the high-speed phase.

Figure 25:
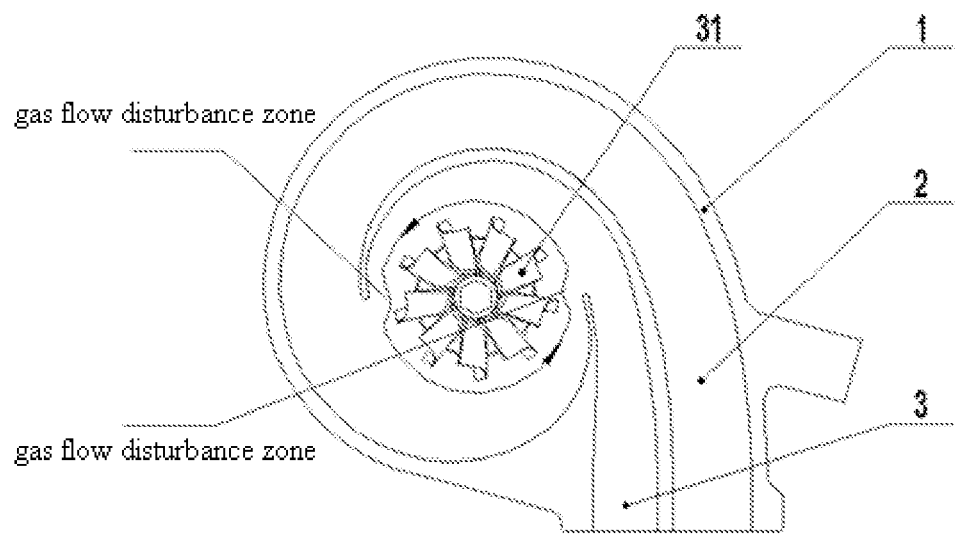
FIG. 25 is a schematic diagram showing gas flow in the turbine without the guide blades according to the first embodiment of the present application.
Figure 26:
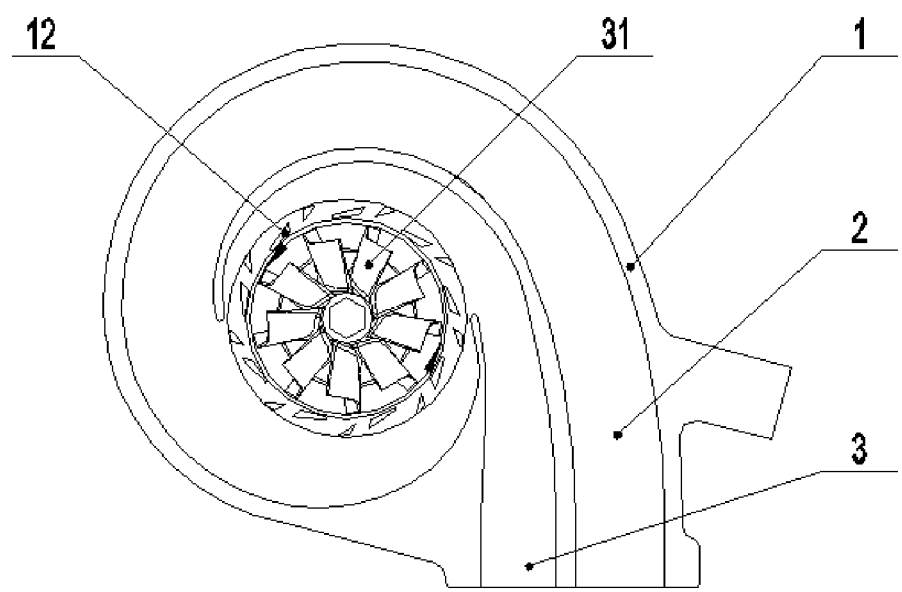
FIG. 26 is a schematic diagram showing gas flow in the turbine with the guide blades according to the first embodiment of the present application.

As shown in FIGS. 25 and 26, return flow of the gas flow is reduced due to the presence of the guide blades, and thus not only improving the efficiency of the turbine, but also making the gas flow smoothly, and further avoiding gas flow disturbance at the throat and ensuring the efficiency of the turbine.

In addition, a pressure ratio and a flow rate of the turbine have a large influence on the performance, and a through-flow section determines the flow rate. In the prior art, the through-flow section may be varied based on design for the flow channel of the turbine housing 1. However, as described in the background part, production consistency for casting the turbine is difficult to control, correspondingly, the flow rate is difficult to control. The guide blade structure is provided in the embodiment, and the through-flow area may be varied based on the guide blade, and the guide blade structure may be formed by precision machining. Therefore, the through-flow area can be precisely controlled without being affected by the machining accuracy of the turbine housing 1.

Figure 27:
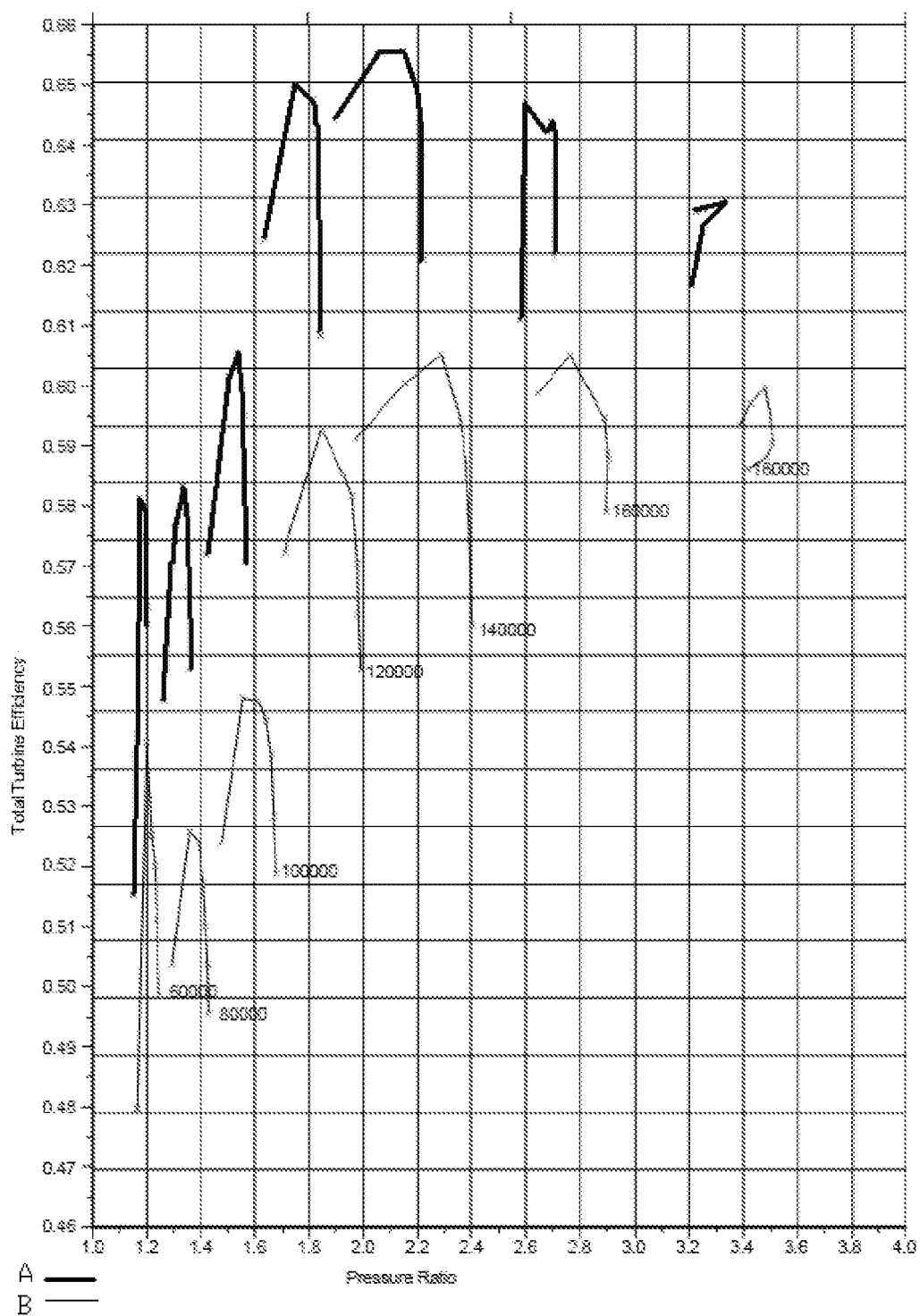
FIG. 27 is an efficiency comparison chart in which A line represents an efficiency line of the turbine of the present application and B line represents an efficiency line of the turbine before the improvement.

By providing the guide blade, the performance of the turbine and the engine has been significantly improved, which are described as follows:

1. The turbine efficiency is significantly improved, as shown in an efficiency comparison diagram in FIG. 27. A thick black line A above represents an efficiency line of the present application, and a thin black line B below represents the efficiency line in the case that the turbine is not modified.

Figure 28:
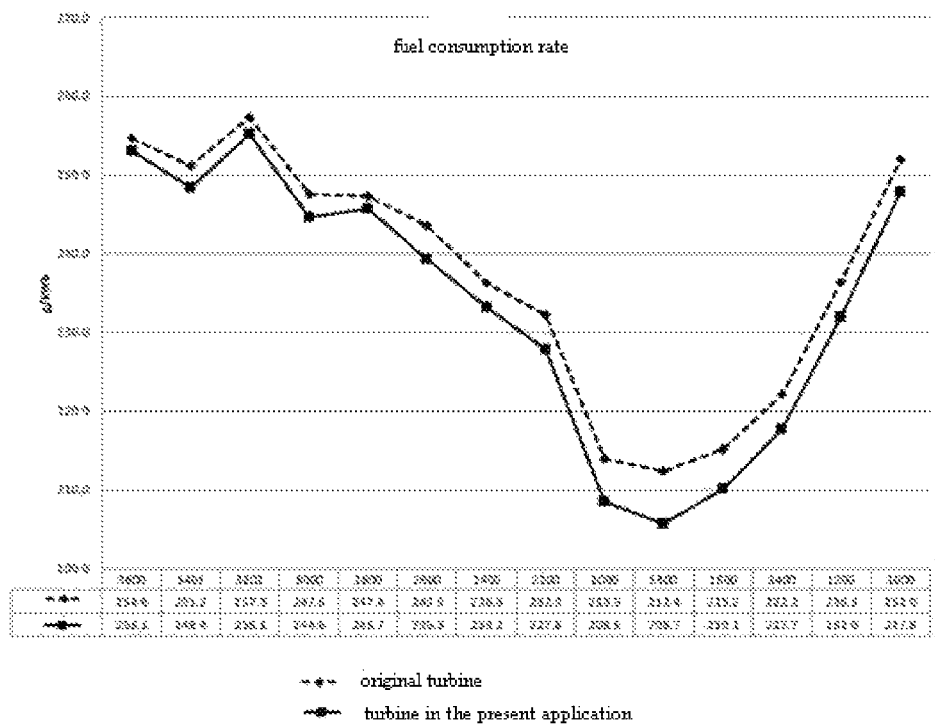
FIG. 28 is a comparison chart of the fuel consumption in the case that the turbine and the engine operate in a linkage mode.

2. A comparison chart of fuel consumption is as shown in FIG. 28 in the case that the turbine and the engine operate in a linkage mode, if the turbocharger of the present application is used, the fuel consumption is reduced greatly in an entire fitting line.

Figure 29:
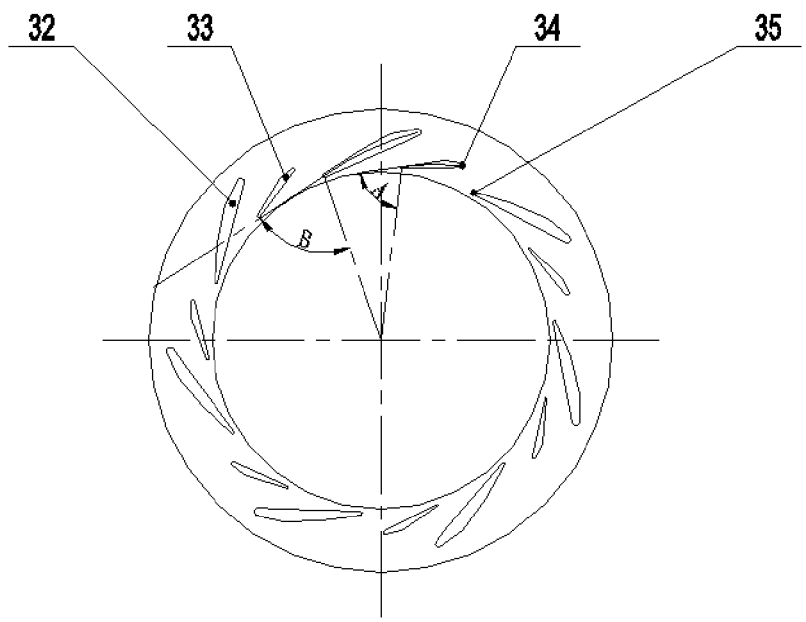
FIG. 29 is a schematic structural diagram of long guide blades and short guide blades according to a fifth embodiment of the present application.

In a fifth embodiment, on the basis of the above-described embodiments, another guide blade arrangement way is further provided according to the present application, as shown in FIG. 29. The guide blade includes long guide blades 32 and short guide blades 33. The length of a long guide blade 32 is greater than the length of a short guide blade 33, the long guide blades 32 and the short guide blade 33 are arranged alternately.

The size of the long guide blade 32 and the short guide blade 33 is determined based on the flow analysis. A trailing edge 34 of the short guide blade 33 and a leading edge 35 of the long guide blade 32 are spaced by a distance in the circumferential direction, so as to facilitate flowing of the gas flow when an engine operates at a high speed, thereby widening the flow rate and reducing the blockage, and realizing the function similar to the slotted guide blade 12 of the previous embodiment. The long guide blades 32 are arranged circumferentially along the guide blade support disk 30 based on a certain angle, and the short guide blades 33 are arranged based on another angle. In the counter-clockwise direction, a channel between the long guide blade 32 and the short guide blade 33 is formed as a guide flow channel communicated with the inner intake gas flow channel 3, and a channel between the short guide blade 33 and the long guide blade 32 is formed as a guide flow channel communicated with the outer intake gas flow channel 2. A specific working procedure may be understood with reference to the above-described slotted guide blades 12.

The arrangement angle B of the long guide blades 32 may be designed to range from 68° to 80°, and an angle difference between the arrangement angle B of the long guide blades 32 and an arrangement angle A of the short guide blades 33 is B−A=0°~5°.

The arrangement angle B refers to an included angle between a tangent line of a center axis of the long guide blade 32 and a connection line between a tip end of the long guide blade 32 close to a center of the guide blade support disc 30 and a center of the guide blade support disc 30. The arrangement angle A refers to an included angle between a tangent line of a center axis of the short guide blade 31 and a connection line between a tip end of the short guide blade 31 close to the center of the guide blade support disc 30 and the center of the guide blade support disc 30.

Figure 30:
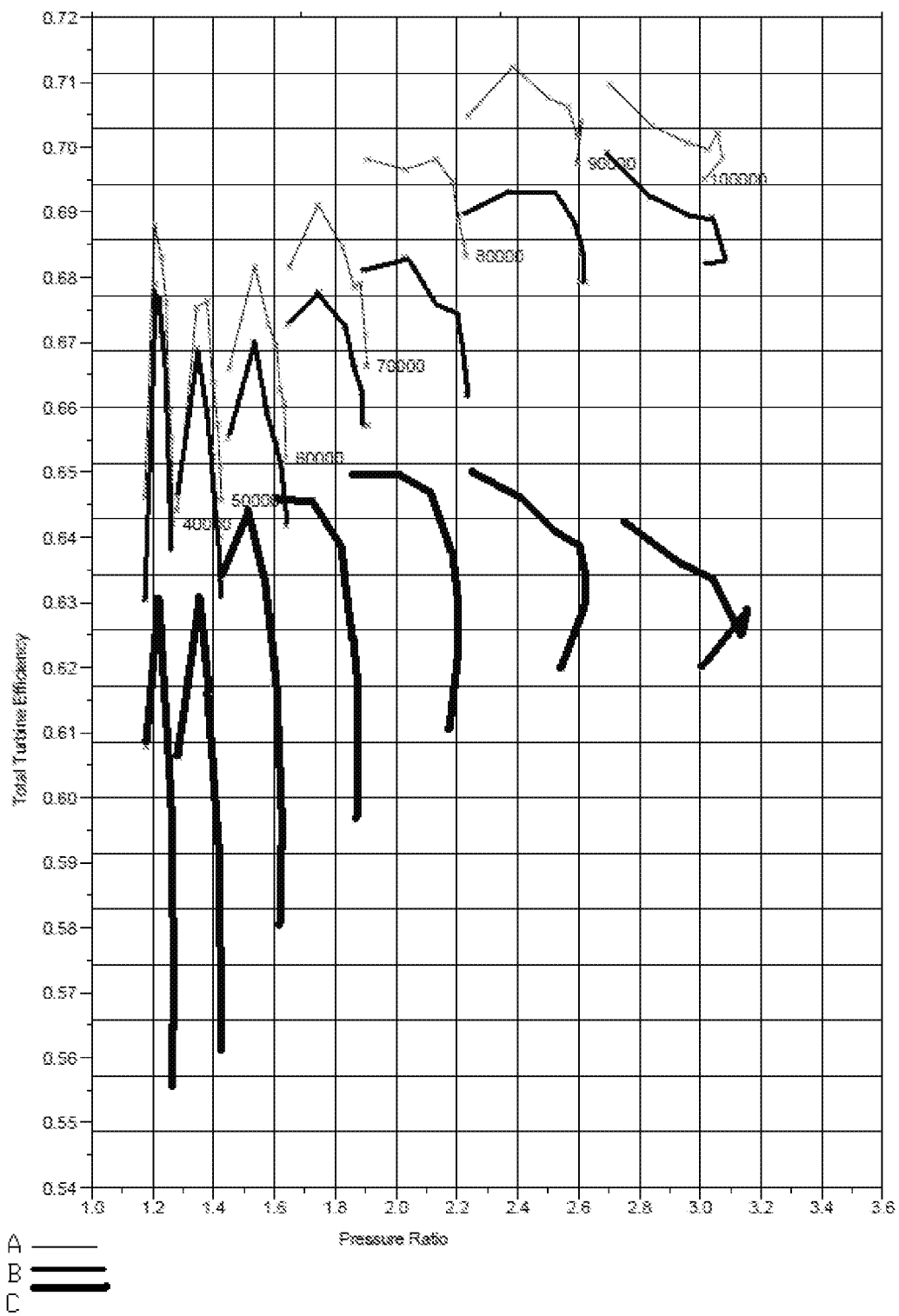
FIG. 30 is an efficiency comparison graph of a turbine having the long guide blades and the short guide blades, a turbine having slotted guide blades, and a conventional wastegate turbine.

The efficiency of the turbine having such guide blade arrangement is higher, and an efficiency comparison chart is as shown in FIG. 30.

The finest black line above represents an efficiency line of a turbine having the long and short guide blades, the thickest black line C below represents an efficiency line of a conventional turbine having a wastegate, and the black line B in the middle represents an efficiency line of the turbine having the slotted guide blade. As can be seen from the above table, the efficiency of the turbine having the long and short guide blades is even higher than that of the turbine in a structure of the slotted guide blade 12.

As can be seen from the above descriptions, whether the slotted guide blade 12 or the fitting arrangement of the long guide blades 32 and the short guide blades 33 are used to form two kinds of channels having a preset angle, i.e. first guide channels and a second guide channels (i.e. the first guide channels and the second guide channels are not arranged in parallel, the included angle is related to the intake gas angle of the inner intake gas flow channel 3 and the outer intake gas flow channel 2), so that the exhaust gas flowing out of the inner intake gas flow channel 3 can be guided to the power turbine 31 via the first guiding channel, and the exhaust gas flowing out of the outer intake gas flow channel 2 can be guided to the power turbine 31 via the second guide channels. As above, the channels between the adjacent slotted guide blades 12 form the first guide channels, and the guide groove 29 forms the second guide channel. In the counter-clockwise direction, the channels between the long guide blade 32 and the short guide blade 33 form the second guide channels, and the channels between the short guide blade 33 and the long guide blade 32 form the first guide channels.

The above-described technical effects may be achieved as long as the exhaust gas from the inner intake gas flow channel 3 and the outer intake gas flow channel 2 can be guided to the power turbine 31 respectively and thus the flow rate range is widened. Obviously, the two guide channels are not limited to be formed by the above-described slotted guide blade 12, and, the long guide blades 32 and the short guide blades 33. In practice, the structure in the above-described embodiment is easy to be machined and does not obstruct the gas flow, thereby having the best guide effect. In addition, the guide support disc 30 and the turbine housing 31 are arranged separately, and the guide support disc 30 can be made through the finish machining, and the precision is easily ensured, thereby further ensuring the distribution of the gas flow and ensuring the efficiency of the turbine.

The present application has been described in detail in accordance with the national patent law, and those skilled in the art can recognize improvements or substitutions for the embodiments disclosed herein. Such modifications fall within the spirit and scope of the present application.

What is claimed is:

1. A variable geometry turbine having a wastegate used for EGR circulation, comprising:
   a turbine housing, and
   a power turbine,
   a regulating valve,
   wherein the turbine housing is provided with an inner intake gas flow channel and an outer intake gas flow channel which guide exhaust gas of an engine to the power turbine for driving the power turbine to rotate, wherein, the turbine housing is further provided with a wastegate pipeline configured to bypass the power turbine, and a wastegate valve configured to control communication of the wastegate pipeline, and in the case that an intake gas amount of the exhaust gas entering into the turbine exceeds a preset value, the wastegate valve is opened to discharge a part of the exhaust gas via the wastegate pipeline, the regulating valve has an adjustable opening degree and is configured to regulate an intake gas amount of the outer intake gas flow channel, and, the regulating valve and the wastegate valve are configured such that the wastegate valve is opened in the case that the regulating valve is opened to a preset angle, the regulating valve is a rotatable midship valve, and the exhaust gas enters via both sides of a body of the regulating valve in the case that the regulating valve is rotated to open, one of the regulating valve and the wastegate valve has a regulating face having a varying axial height in a rotation direction of the regulating valve, and the other of the regulating valve and the wastegate valve has a linking portion which makes contact and cooperates with the regulating face, such that the wastegate valve is moved in an axial direction of the regulating valve and opened in the case that the regulating valve is rotated to open.

2. A variable geometry turbine having a wastegate used for EGR circulation, comprising:
a turbine housing, and
a power turbine,
a regulating valve,
wherein the turbine housing is provided with an inner intake gas flow channel and an outer intake gas flow channel which guide exhaust gas of an engine to the power turbine for driving the power turbine to rotate, wherein, the turbine housing is further provided with a wastegate pipeline configured to bypass the power turbine, and a wastegate valve configured to control communication of the wastegate pipeline, and in the case that an intake gas amount of the exhaust gas entering into the turbine exceeds a specific value, the wastegate valve is opened to discharge a part of the exhaust gas via the wastegate pipeline, the regulating valve has an adjustable opening degree and is configured to regulate an intake gas amount of the outer intake gas flow channel, and, the regulating valve and the wastegate valve are configured such that the wastegate valve is opened in the case that the regulating valve is opened to a specific angle, the regulating valve is a rotatable midship valve, and the exhaust gas enters via both sides of a body of the regulating valve in the case that the regulating valve is rotated to open, wherein the regulating valve makes contact with the wastegate valve in an axial direction of the regulating valve, and the variable geometry wastegate turbine further comprises comprises an end cap mounted on the turbine housing, and the end cap is snapped into an end face of the regulating valve for driving the regulating valve to rotate;

one of the end cap and the regulating valve has a regulating face having a varying axial height in a rotation direction of the regulating valve, the other of the end cap and the regulating valve has a linking portion which makes contact and cooperates with the regulating face, such that the wastegate valve is moved in an axial direction of the regulating valve and opened in the case that the regulating valve is rotated.

3. The variable geometry turbine having the wastegate according to claim 1, wherein the axial height of the regulating face increases spirally around axis of rotation of the regulating valve, and the linking portion is a regulating rod which makes contact and cooperates with the regulating face.

4. The variable geometry turbine having the wastegate according to claim 1, wherein the regulating face has a convex portion which protrudes smoothly in the rotation direction of the regulating valve and a concave portion correspondingly formed on the regulating face, and the linking portion is an axial projection, the axial projection slides on the concave portion and the convex portion successively when the axial projection rotates with respect to the regulating face.

5. The variable geometry turbine having the wastegate according to claim 1, wherein the regulating valve is provided with a cam which rotates along with the regulating valve, and the wastegate valve is provided with a regulating rod which makes contact and cooperates with an edge of the cam.

6. The variable geometry turbine having the wastegate according to claim 1, further comprising a spring, wherein the spring is configured to control the wastegate valve to reset into a closed state when the regulating valve and the wastegate valve are not linked.

7. The variable geometry turbine having the wastegate according to claim 1, further comprising a valve seat, wherein the valve seat is provided with a valve seat inner flow channel interface, a valve seat outer flow channel interface, a valve seat wastegate inlet and a valve seat wastegate outlet, wherein the regulating valve and the wastegate valve are arranged in the valve seat;
the valve seat is arranged between an exhaust pipe and an intake gas end of the turbine housing.

8. The variable geometry turbine having the wastegate according to claim 1, wherein the wastegate valve is mounted directly in the turbine housing, and the regulating valve is mounted in the turbine housing in an inserting manner for directly regulating the intake gas amount entering into the outer intake gas flow channel.

9. The variable geometry turbine having the wastegate according to claim 8, wherein the turbine is provided with two sets of the outer intake gas flow channels, and the inner intake gas flow channels and the wastegate pipelines for a six-cylinder engine, the regulating valve comprises two valve bodies connected with each other, and after being inserted into the turbine housing, the two valve bodies are configured to control intake gas amounts of the two outer intake gas flow channels simultaneously and respectively.

10. The variable geometry turbine having the wastegate according to claim 1, further comprising a guide blade support disc arranged at an intake gas end face of the power turbine, and
wherein a plurality of first guide channels and a plurality of second guide channels are arranged at intervals on the guide blade support disc in a circumferential direction of the guide blade support disc, the first guide channel and the second guide channel form a predetermined angle, such that the exhaust gas flowing out of the inner intake gas flow channel is guided to the power turbine via the plurality of first guide channels, and the exhaust gas flowing out of the outer intake gas flow channel is guided to the power turbine via the plurality of second guide channels.

11. The variable geometry turbine having the wastegate according to claim 10, wherein a plurality of guide blades which protrude from the guide blade support disc are circumferentially arranged on the guide blade support disc, each of the guide blades is provided with a guide groove running through the guide blade, and a plurality of slotted guide blade is formed;
   a channel between adjacent slotted guide blades form the plurality of first guide channel, and the guide grooves form the plurality of second guide channels.

12. The variable geometry turbine having the wastegate according to claim 10, wherein a plurality of long guide blades and a plurality of short guide blades are arranged on of the guide blade support disc alternately, and the long guide blades and short guide blades protrude from the guide blade support disc, and in a counter-clockwise direction, channels between the plurality of long guide blades and the plurality of short guide blades form the plurality of second guide channels, and channels between the plurality of short guide blade and the plurality of long guide blade form the plurality of first guide channels.

13. The variable geometry turbine having the wastegate according to claim 12, wherein an arrangement angle B of each of the long guide blades ranges from 68° to 80°, and an arrangement angle A of each of the short guide blades meets the requirement of a following equation: B−A=0°~5°.

14. A variable geometry turbine having a wastegate used for EGR circulation, comprising:
   a turbine housing,
   a power turbine,
   a valve seat,
   an exhaust pipe, and
   a control accessory,
   wherein the turbine housing is provided with an inner intake gas flow channel and an outer intake gas flow channel, each of the inner intake gas flow channel and the outer intake gas flow channel is in a non-full circumference structure, and the inner intake gas flow channel carries intake gas, from 0° to 150°~230°, of the power turbine, and the outer intake gas flow channel carries intake gas from 150°~230° to 360°,
   wherein the turbine housing is further provided with a wastegate pipeline, and the wastegate pipeline is arranged in parallel with the outer intake gas flow channel and the inner intake gas flow channel without passing through the power turbine,
   wherein the turbine housing, the valve seat and the exhaust pipe are sealingly connected together, and a regulating valve is mounted in the valve seat, the regulating valve is configured to regulate an intake gas amount of the outer intake gas flow channel, an end of the regulating valve is provided with a regulating face in a spiral structure, and an axial height of the regulating face increases spirally around an axis center of the regulating valve.

15. The variable geometry turbine having the wastegate used for EGR circulation according to claim 14,
   wherein a wastegate valve which cooperates with the regulating valve is arranged in the wastegate pipeline, the wastegate valve is mounted in the valve seat through a wastegate valve bushing, a spring is mounted between the wastegate valve and the wastegate valve bushing, one side of the wastegate valve close to the regulating valve is provided with a regulating rod which cooperates with the regulating face,
   wherein in the operation, the control accessory drives the regulating valve to rotate, the regulating face of the regulating valve pushes the regulating rod while an intake gas amount of the outer intake flow passage is regulated by the regulating valve, and the wastegate valve is opened and the spring is compressed, and the exhaust gas to be bypassed is discharged from the wastegate pipeline,
   wherein when the regulating valve returns to an initial position, the wastegate valve returns to an initial position under the action of elastic force of the spring, and the exhaust gas is no longer bypassed.

16. The variable geometry turbine having the wastegate used for EGR circulation according to claim 14, wherein,
   a guide blade support disc is mounted at a position close to the power turbine in the turbine housing, and a plurality of slotted guide blades are arranged on the guide blade support disc, and the plurality of slotted guide blades are evenly in a shape of a ring uniformly;
   each of the slotted guide blades is in a form of a gas-solid combined nozzle, wherein when the engine operates at a low speed and a low load, the inner intake gas flow channel of the turbine works, and an intake angle of the inner intake gas flow channel is obtained according to a formula $\tan(\alpha)=2\pi b/(A/r)$, where b is an inlet width of the turbine, which is a fixed valve, and the intake gas angle is defined based on A/r of the inner intake gas flow channel,
   a guide blade angle of the inner intake gas flow channel is designed based on the intake gas angle of the inner intake gas flow channel, which ensures that the guide blade angle is substantially the same as the intake gas angle, wherein gas enters into the guide blades along the inner intake gas flow channel, and then enters into the power turbine along the guide blades without turning loss in a whole process.

17. The variable geometry turbine having the wastegate used for EGR circulation according to claim 16, wherein,
   a guide groove is arranged at a middle position of each of the slotted guide blades, an arrangement angle of each of the slotted guide blades ranges from 68° to 80°, and two groove edges of the guide groove are obtained by rotating a cut-way line around a center of the guide blade support disc, and the smallest width of the guide groove is 3 mm.

18. The variable geometry turbine having the wastegate used for EGR circulation according to claim 16, wherein,
   the slotted guide blades comprises long guide blades and a short guide blades, the length of each of the long guide blades is larger than the length of each of the short guide blades, the long guide blades and the short guide blades are arranged alternately, a trailing edge of the short guide blade and a leading edge of the long guide blade are spaced by a certain distance in a circumferential direction.

* * * * *